(12) United States Patent
Naqvi

(10) Patent No.: US 9,552,587 B2
(45) Date of Patent: Jan. 24, 2017

(54) SYSTEM AND METHOD FOR MEDIATING REPRESENTATIONS WITH RESPECT TO PREFERENCES OF A PARTY NOT LOCATED IN THE ENVIRONMENT

(71) Applicant: Shamim A. Naqvi, Morristown, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 0 days.

(21) Appl. No.: 14/701,874

(22) Filed: May 1, 2015

(65) Prior Publication Data

US 2016/0014556 A1 Jan. 14, 2016

Related U.S. Application Data

(60) Provisional application No. 62/023,457, filed on Jul. 11, 2014, provisional application No. 62/113,605, filed on Feb. 9, 2015.

(51) Int. Cl.
*H04W 24/00* (2009.01)
*G06Q 30/02* (2012.01)
*H04W 4/02* (2009.01)

(52) U.S. Cl.
CPC ...... *G06Q 30/0205* (2013.01); *G06Q 30/0201* (2013.01); *H04W 4/02* (2013.01); *H04W 4/021* (2013.01); *H04W 4/027* (2013.01); *H04W 4/028* (2013.01)

(58) Field of Classification Search
CPC ........ H04M 1/7253; H04W 8/18; H04W 4/02; G06Q 30/0267; G06Q 30/0269; G06Q 50/01; G06Q 30/0261; G06Q 30/02; G06Q 20/322; G06Q 30/0207; G06Q 30/0277; G06Q 30/0238; G06Q 30/0255; G06Q 30/0259; G06Q 30/0203; G06Q 30/0204
(Continued)

(56) References Cited

U.S. PATENT DOCUMENTS

| | | |
|---|---|---|
| 2011/0289392 A1 | 11/2011 | Naqvi |
| 2012/0021770 A1 | 1/2012 | Naqvi |
| 2012/0101903 A1 | 4/2012 | Oh |

(Continued)

OTHER PUBLICATIONS

Tofel, "With New Apps Google Now May Be Your Future Home Screen", dated Jan. 30, 2015. Downloaded at https://gigaom.com/2015/01/30/with-new-apps-google-now-may-be-your-future-home-screen/, 8 pages.

Frost, "iBeacon in iOS 8 getting location based notifications, plus: FCC filing suggests Apple to launch own iBeacon hardware", dated Sep. 2, 2014. Downloaded at http://www.macworld.co.uk/news/iosapps/apples-plans-for-ibeacon-hardware-new-ios-8-location-notifications-3542708/, 5 pages.

(Continued)

*Primary Examiner* — Kwasi Karikari

(57) ABSTRACT

System and methods are provided to create representations of geographic areas. Such representations enable users to search for items and services of interest and to quickly locate and utilize such items and services. Representations are created using user preferences thus reducing the amount of information presented to a user, i.e., user preferences control the contents of a representation. Control APIs contained within a representation may be used to control devices represented in a representation or to manufacture them using 3-D printing technologies. Methods to learn user preferences via his movements and other actions and impose a user's preferences upon an environment are shown. Some details of the invention are described by applying the invention to problems in retail marketing and figures depicting an implementation illustrate certain aspects of the invention.

5 Claims, 34 Drawing Sheets

DEVICE MOVING FROM LEFT TO RIGHT OF FIGURE, OCCUPYING POSITIONS A, B, C, D AND E SUCCESSIVELY

(58) Field of Classification Search
USPC ..... 455/41.2, 414.1, 414.3, 428, 432.3, 420;
705/14.65, 14.66, 14.67, 26.1, 26.2,
705/26.25; 709/207, 225
See application file for complete search history.

(56) References Cited

U.S. PATENT DOCUMENTS

| | | |
|---|---|---|
| 2012/0271715 A1 | 10/2012 | Morton |
| 2013/0132277 A1 | 5/2013 | Naqvi |
| 2014/0129393 A1* | 5/2014 | Soon-Shiong ......... G06Q 30/06 705/27.2 |
| 2014/0258471 A1 | 9/2014 | Etchegoyen |
| 2014/0295804 A1 | 10/2014 | Naqvi |
| 2014/0370869 A1 | 12/2014 | Naqvi |
| 2015/0073901 A1* | 3/2015 | Arnold ............... G06Q 30/0255 705/14.53 |
| 2015/0088701 A1* | 3/2015 | Desmarais ........... G06Q 10/087 705/28 |

OTHER PUBLICATIONS

Hastie, Tibshirani, and Friedman: The Elements of Statistical Learning, Second Edition, Springer, 2009.
Evgeny Morozov: To Save Everything, Click Here, www.publicaffairsbooks.com, see also Perseus Books, 2013.
Hastie, et al., "The Elements of Statistical Learning, Data Mining, Inference and Prediction" Second Edition, copyright 2009, Chapter 2: "Overview of Supervised Learning", pp. 9-39.

* cited by examiner

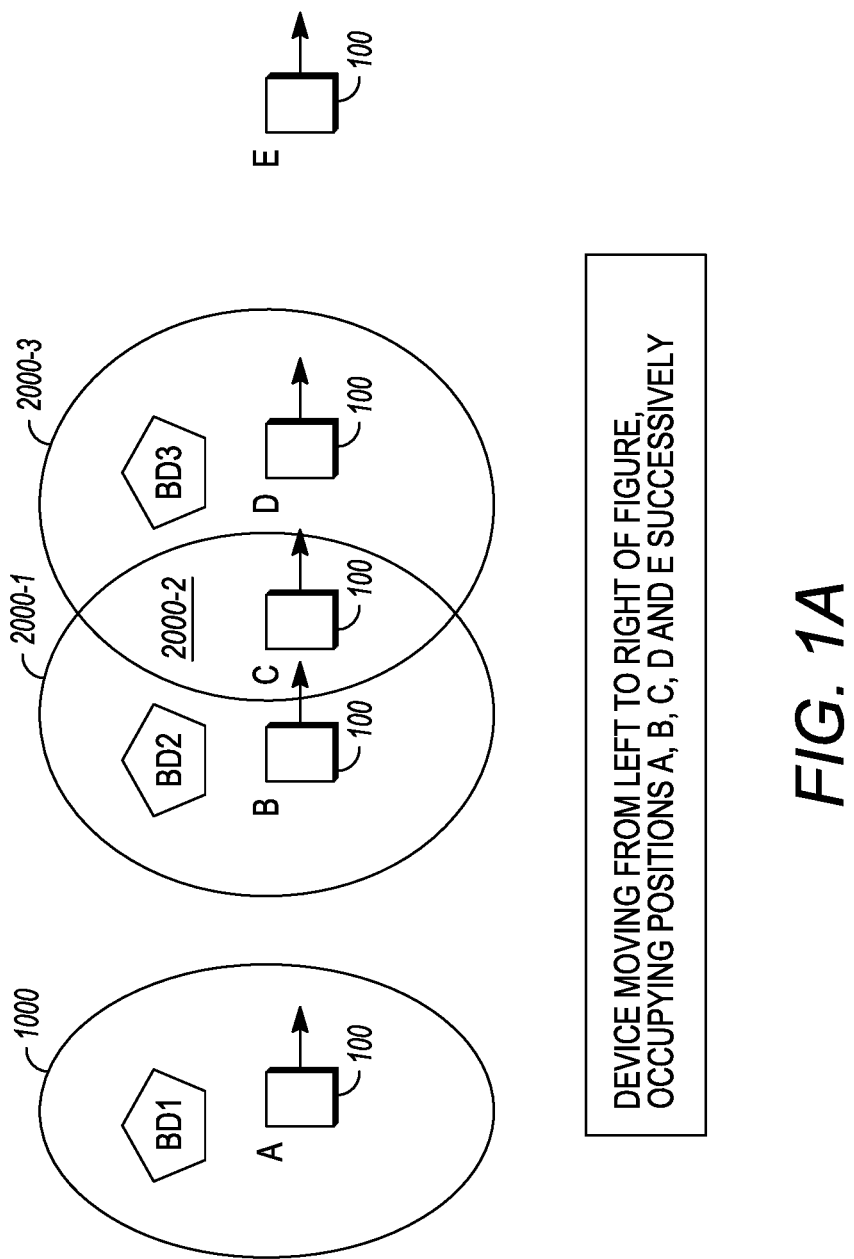

| THE   | 2 |
| QUICK | 1 |
| BROWN | 1 |
| FOX   | 1 |
| JUMP  | 3 |
| AND   | 2 |
| OVER  | 1 |
| FENCE | 1 |

*FIG. 8*

| THE  | [9]   |
| AND  | [1]   |
| JUMP | [1,1] |

*FIG. 9*

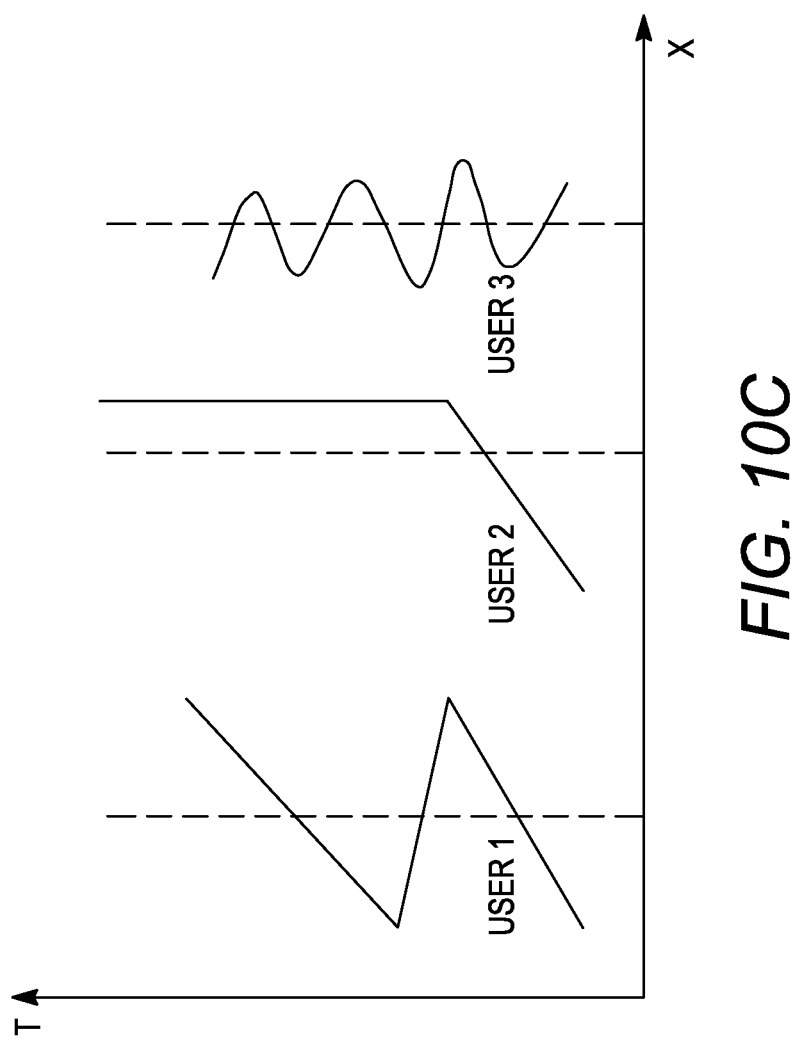

| PREDICTIONS | (14) |
|---|---|
| PAST     LINGER     BEACON | |
| UNDO | [BJORK] |
| YOU'RE THE ONE | [DWIGHT YOAKAM] |
| SEHR KOSMISCH | [HARMONIA] |
| REVELRY | [KINGS OF LEON] |
| DANCE AND ELECTRONICA | 33SECS |
| DANCE AND ELECTRONICA | 28SECS |
| UNDO | [BJORK] |
| YOU'RE THE ONE | [DWIGHT YOAKAM] |
| SINCERITE ET JALOUSIE | [ALLIANCE ETHNIK] |
| HORN CONCERTO NO. 4 IN E FLAT K495:\|\|. ROMANCE (ANDANTE CANTABILE) | [BARRY TUCKWELL/ACADEMY OF ST MARTIN-IN THE-FIELDS/SIR NEVILLE MARRINER] |
| SEHR KOSMISCH | [HARMONIA] |
| CATCH YOU BABY (STEVE PITRON &MAX SANNA RADIO EDIT) | [LONNIE GORDON] |
| SECRETS | [ONEREPUBLIC] |
| REVELRY | [KINGS OF LEON] |

*FIG. 12*

| ARTIST/BAND | DURATION | GENRE | MONTHS SINCE RELEASE | EXPLICIT | LIKE |
|---|---|---|---|---|---|
| PAULA ABDUL | 2:38 | R&B | 36 | NO | YES |
| RIHANNA | 4:00 | POP | 24 | NO | YES |
| DEBUSSY | 3:50 | CLASSICAL | | NO | YES |
| ROLLING STONES | 4:06 | R&B | 30 | YES | NO |
| ALICIA KEYS | 3:50 | R&B | 6 | NO | ? |

FIG. 13

REGISTRATION EVENTS

📍 8:51 AM 34:5F:DF

📍 8:51 AM JOHN

HEAT MAP

OFF

HOT LINGER AISLES
HOT VISITS

FIG. 26

| PURCHASE HISTORY |
| --- |
| (8) |

| COMMUNICATION BREAKDOWN ("ONE NIGHT STAND" LIVE VERSION FROM BBC SESSIONS) |
| --- |
| [LED ZEPPELIN] |
| BACK IN TIME (LP VERSION) |
| [HUEY LEWIS AND THE NEWS] |
| HEART AND SOUL (LP VERSION) |
| [HUEY LEWIS AND THE NEWS] |
| THE RAIN SONG (2007 REMASTERED LIVE VERSION FROM THE SONG REMAINS THE SAME) |
| [LED ZEPPELIN] |
| ROCKIN' INTO THE NIGHT |
| [38 SPECIAL] |
| ANIMAL |
| [KE$HA] |
| OVER THE HILLS AND FAR AWAY (LIVE ALBUM VERSION |
| [LED ZEPPELIN] |
| BLACK DOG (2007 REMASTERED SIGLE/LP VERSION) |
| [LED ZEPPELIN] |

*FIG. 30*

| RELATED SOCIAL TERMS | (1) |
|---|---|
| #GETTHELEDOUT | |

| RECENTLY SHOWN ADS | (3) |
|---|---|
| #BOSS<br>#NICKI_MINAJ<br>#ZEPPELINLIVE | |

| PREDICTIONS (14) | |
|---|---|
| PAST    LINGER    BEACON | |
| UNDO | [BJORK] |
| YOU'RE THE ONE | [DWIGHT YOAKAM] |
| SEHR KOSMISCH | [HARMONIA] |
| REVELRY | [KINGS OF LEON] |
| DANCE AND ELECTRONICA | 33SECS |
| DANCE AND ELECTRONICA | 28SECS |
| UNDO | [BJORK] |
| YOU'RE THE ONE | [DWIGHT YOAKAM] |
| SINCERITE ET JALOUSIE | [ALLIANCE ETHNIK] |
| HORN CONCERTO NO. 4 IN E FLAT K495:\|\|. ROMANCE (ANDANTE CANTABILE) | [BARRY TUCKWELL/ACADEMY OF ST MARTIN-IN THE-FIELDS/SIR NEVILLE MARRINER] |
| SEHR KOSMISCH | [HARMONIA] |
| CATCH YOU BABY (STEVE PITRON &MAX SANNA RADIO EDIT) | [LONNIE GORDON] |
| SECRETS | [ONEREPUBLIC] |
| REVELRY | [KINGS OF LEON] |

*FIG. 34*

SYSTEM AND METHOD FOR MEDIATING REPRESENTATIONS WITH RESPECT TO PREFERENCES OF A PARTY NOT LOCATED IN THE ENVIRONMENT

CROSS-REFERENCE TO RELATED APPLICATIONS

This application is a non-provisional and claims priority to U.S. Provisional No. 62/023,457, filed Jul. 11, 2014 entitled "A System and Method for Creating and Rendering Mediated Reality Representations of Networked Spaces Using a SoftCamera" and is also a non-provisional and claims priority to U.S. Provisional Application No. 62/113,605, filed Feb. 19, 2015 entitled "Mediated Representations of Real and Virtual Spaces", the entirety of each prior application being incorporated by reference herein. This application is related to U.S. application Ser. No. 14/701,858 (Our Ref.: 12000/2) entitled "A System and Method for Mediating Representations With Respect to User Preferences" filed concurrently herewith. This application is also related to U.S. patent application Ser. No. 14/701,883 (Our Ref.: 12000/6) entitled "A System and Method for Inferring the Intent of a User While Receiving Signals On a Mobile Communication Device From a Broadcasting Device" filed concurrently herewith.

BACKGROUND

New devices with computational capabilities continue to be installed in physical geographical spaces, leading to analysis and better use of services available to consumers. The present invention relates to creating personalized representations of such spaces.

SUMMARY

In accordance with one aspect of the invention an environment is a collection of geographical locations from where a mobile device may receive signals being broadcast or transmitted by one or more broadcasting devices. The signals from an environment or about an environment may be gathered into one or more datasets called the Environment Data Sets (EDS).

In accordance with one aspect of the invention a triggered device is a mobile device in an environment that is responsive to signals transmitted from broadcasting or transmitting devices. Examples of broadcasting or transmitting devices are Wi-Fi routers, Gimbal or other broadcasting devices using the iBeacon specification, devices that broadcast using Wi-Fi signals or Bluetooth signals or other such short-range radio signals, etc.

In accordance with one aspect of the invention a mobile device is a mobile phone, smartphone, PDA, tablet, smart glasses, smart watch, wearable computer, a computer embedded within another device or human body, etc.

In accordance with one aspect of the invention a mobile device is a combination of a smartphone and one or more associated devices, said association achieved through short-range pairing/associating technologies such as Bluetooth, Wi-Fi, etc.

In accordance with one aspect of the invention a triggered device causes the received signals to be gathered into one or more EDS; said EDS may be connected to the triggered device by a network connection (wired or wireless); said EDS may also be connected to a cluster of servers with specialized logic in a wide area network (cloud).

In accordance with one aspect of the invention a system and method is provided whereby the EDS are used by said specialized logic to create one or more mediated representations of said environment.

In accordance with one aspect of the invention, mediating a representation of an environment via its EDS comprises changing the occurrence, existence or presentation order of objects in said EDS by using preferences of one or more users; said mediation may result in some, none or all the objects and features in said EDS being present in the mediated representation.

In accordance with one aspect of the invention preferences of a user are derived by machine-learning techniques, or through explicit input from one or more users, or obtained from one or more third-party service providers, or from a preference-broker interface.

In accordance with one aspect of the invention mediating a representation comprises inferring user movements from signals from one or more devices broadcasting or transmitting within an environment.

In accordance with one aspect of the invention mediating a representation comprises determining user movements from signals received from broadcasting or transmitting devices within an environment by a triggered device.

In accordance with one aspect of the invention user movements are determined by extrapolating from device/user positions as measured by signals from devices broadcasting or transmitting within the environment.

In accordance with one aspect of the invention the extrapolation of user/device positions yield patterns of user movements.

In accordance with one aspect of the invention determining user movements involves matching the inferred patterns with stored patterns and selecting a matching pattern.

In accordance with one aspect of the invention matching an inferred pattern with a stored pattern involves using heuristic pattern-matching techniques.

In accordance with one aspect of the invention pattern matching involves matching an inferred pattern with patterns of previously stored patterns from other users of the system.

In accordance with one aspect of the system pattern matching involves the use of machine-learning techniques to infer a pattern.

In accordance with one aspect of the invention user movements in an environment are correlated with identities of items and objects in an environment, said item or object identifiers being assembled into a collection of identifiers.

In accordance with one aspect of the invention the identities and locations of items within an environment are retrieved from a planogram or other data feeds.

In accordance with one aspect of the invention the correlation of items at a location in an environment with user movements involves correlating an inferred user movement and an item selected from a plurality of items, said selection made by considering the movements of other users in said location, said user's historical actions (purchases) in said location, said items popularity in terms of units of sale from historical sale data, etc.

In accordance with one aspect of the invention mediating a representation comprises coordinating multiple data feeds to filter a collection of object or item identifiers proximate to an element in an environment.

In accordance with one aspect of the invention filtering a collection of item or objects identifiers comprises reducing the total number of items or object identifiers based on online data feeds, planogram feeds, social data feed, dynamic taxonomy feed, etc.

In accordance with one aspect of the invention a dynamic taxonomy feed comprises a method to generate correlations between items proximate to an element in an environment and items and objects described on web pages and web sites.

In accordance with one aspect of the invention filtering a collection of items or objects proximate to one or more elements in an environment comprises the use of machine-learning technology to reduce the number of item or object identifiers in said collection.

In accordance with one aspect of the invention filtering a collection of item or object identifiers proximate to one or more elements in an environment comprises a method to remove certain items from said collection and/or adding newer items to said collection, said newer items not necessarily being proximate to the said elements.

In accordance with one aspect of the invention a system and method whereby a mobile device acting as a Triggered device in an environment constructs or causes to be constructed a mediated representation of said environment comprising at least one element of the environment, said element providing at least one end user service.

In accordance with one aspect of the invention the objects in a representation are controlled by acquiring a control API for said objects from an external resource accessible via network connections.

In accordance with one aspect of the invention an object in a representation is issued a command using an acquired control API, said command communicated to the object in the environment via the triggered device utilizing network connections.

In accordance with one aspect of the invention an object in a representation is issued a command using an acquired control API, said command communicated to the object through network links connecting the device on which the representation is being rendered and the object within the environment.

In accordance with one aspect of the invention an Internet Connected Device (ICD) is added to one or more representations by a user command, said ICD is issued commands using the control API of the device upon which the representation is being rendered.

In accordance with one aspect of the invention a system and method whereby a mobile device acting as a Triggered device creates a mediated representation of an environment, said representation containing at least one element of the environment providing an end user service, wherein control API for said service is obtained from a Directory Server.

In accordance with one aspect of the invention the Directory Server is accessed through fixed and/or wireless network connections.

In accordance with one aspect of the invention the Directory Server is logically contained in the systems of the present invention and is accessed by using internal system links.

In accordance with one aspect of the invention the Directory Server contains control API as data elements that can be retrieved via query languages.

In accordance with one aspect of the invention the Directory Server contains control APIs for one or more devices, said devices may be installed in one or more environments.

In accordance with one aspect of the invention the Directory Server receives control APIs for one or more devices by a pull mechanism wherein Directory Server interrogates a network resource to acquire said control APIs.

In accordance with one aspect of the invention the Directory Server contains 3-D printing designs of products.

In accordance with one aspect of the invention the Directory Server contains referential addresses or links to stored 3-D printing designs of products.

In accordance with one aspect of the invention the control APIs are pushed to a Directory Server by devices or by a network resource.

In accordance with one aspect of the invention a system and method wherein one or more mobile devices acting as triggered devices in an environment cause a mediated representation to be generated of said environment that contains, inter alia, objects representing all triggered devices and possibly none, one or all mobile devices (that may or may not be not be acting as Triggered devices) in said environment.

In accordance with one aspect of the invention a system and method wherein one or more mobile devices acting as triggered devices in an environment cause a succession of mediated representations to be generated of said environment that contains, inter alia, objects representing all triggered devices and possibly none, one or all mobile devices (that may not be acting as Triggered devices) in said environment, said rate of succession controlled by a predetermined and configurable clock.

In accordance with one aspect of the invention the representations containing objects representing multiple triggered devices may be preferentially biased to one or all Triggered devices, said preferences available by user command or by system policy.

In accordance with one aspect of the invention, a system and method whereby, a mobile device acting as a Triggered device, in an environment causes a mediated representation of the environment to be created, said representation includes an object representing itself. Moreover, the representation contains or can obtain a control API for said object representing the Triggered device.

In accordance with one aspect of the invention the Triggered device is controlled and managed through the control API contained in the representation, or through a control API obtained from a (network) resource.

In accordance with one aspect of the invention a new set of user preferences are input to the object representing the Triggered device in a representation wherein said preferences are input via a human-curation interface, obtained from a preference broker, or obtained from internal storage of the invention.

In accordance with one aspect of the invention a system and method whereby a mobile device acting as a Triggered device in an environment causing a representation of said environment to be created, comprising associating a collection of item or object identifiers in said environment with a collection of user preferences in a storage system.

In accordance with one aspect of the invention retrieving the associated user preferences and collection of item or object identifiers from a storage system.

In accordance with one aspect of the invention storing associated user preferences and collection of item identifiers.

In accordance with one aspect of the invention storing user preferences associated with a collection of item identifiers in an address space defined by a torus data structure.

In accordance with one aspect of the invention a torus data structure using a method of creating partitions, each partition being controlled by a manager process.

In accordance with one aspect of the invention mapping data items consisting of user preferences associated with collection of item identifiers to individual points in the address space of the torus.

In accordance with one aspect of the invention load balancing the data items in the partitions of a torus address space.

In accordance with one aspect of the invention maintaining consistency of data in case of failure of a partition manager by enlarging the size of its neighboring partitions.

In accordance with one aspect of the invention retrieving all data items in a partition of a torus address space as a response to a search request for a single data item stored in said partition of the torus address space.

In accordance with one aspect of the invention a system and method whereby a mobile device acting as a Triggered device in an environment, comprising publishing a computer-readable representation of an environment, furthermore, wherein publishing comprises using an internal or externally provided layout template, using an internally or externally provided typography module, using an internal or externally provided group of device profiles and device capabilities, using a retrieved collection of user preferences associated with item identifiers in an environment.

In accordance with one aspect of the invention associating more than one group of user preferences with a collection of item identifiers discovered by a triggered device in an environment.

In accordance with one aspect of the invention publication of a computer readable representation of an environment comprises producing such an object subject to a pre-determined time.

In accordance with one aspect of the invention publication of a computer-readable representation comprises producing a sequence of said objects at a rate determined by a pre-determined and configurable timer.

In accordance with one aspect of the invention the calculation of the timer interval comprise methods to determine the number, type and capacity of the computing resources available, and the availability of type and capacity of communication links.

In accordance with one aspect of the invention the publication of a computer-readable representation comprises producing a plurality of such representation modulated by device information.

In accordance with one aspect of the invention the publication of a computer-readable representation comprises producing one or more such representations modulated by user preferences.

In accordance with one aspect of the invention publishing of a computer-readable representation comprises modulating the objects within said representation with information provided by a human-curation interface.

In accordance with one aspect of the invention the publication of a computer-readable representation comprises producing one or more such representations suitable for rendering on 3-D printing devices.

In accordance with one aspect of the invention the publication of a representation comprises producing one or more representations suitable for rendering as a 3-D representation, a holographic image, or a 3-D printable design.

In accordance with one aspect of the invention a system and method whereby a mobile device acting as a Triggered device in an environment causes a representation of said environment to be created, comprising objects mediated by one set of user preferences and a second group of objects mediated by a second set of user preferences.

In accordance with one aspect of the invention, mediating a representation by a set of user preferences implies depicting those objects in the representation that conform to said user preferences.

In accordance with one aspect of the invention mediating a representation by a set of user preferences comprises using an external, third party provided mediation engine.

In accordance with one aspect of the invention mediating a representation by a set of user preferences comprises requesting and receiving said user preferences from an external, third party provider or a network of user preference providers.

In accordance with one aspect of the invention creating a representation comprises retrieving from a storage system an associated group of user preferences and item identifiers in an environment, retrieving a second group of user preferences and collection of item identifiers and publishing both sets of retrieved data in a single representation.

In accordance with one aspect of the invention creating a representation comprises retrieving from a storage system an associated group of user preferences and item identifiers in an environment, retrieving a second group of user preferences and collection of item identifiers and creating a single representation by combining the two retrieved collections, at least one set of user preferences relating to a user who is not an owner of or associated with the triggered device.

In accordance with one aspect of the invention orchestrating two or more objects being represented within a representation, said orchestration comprising synchronization in time and location in an environment between the user movements of a first triggered device and the stored user movements of a second triggered device.

In accordance with one aspect of the invention a representation is created that identifies a collection of locations within an environment that are suitable for displaying content from content providers.

In accordance with an aspect of the present invention the suitable locations in an environment are communicated to content providers.

In accordance with an aspect of the present invention service providers and suitable locations for displaying content are linked in a network controlled by a real-time broker object and real-time bidding mechanism.

In accordance with an aspect of the present invention a representation receives content from content providers that is integrated into said representation based on triggered device location being proximate to a previously identified "suitable spot".

In accordance with an aspect of the present invention a single triggered device creates two representations, each representation being modulated by one set of user preferences, and each representation containing collections of objects from the other (second) representation.

In accordance with an aspect of the present invention a set of user preferences is explicitly input to the Publishing Engine through a human-curation interface.

In accordance with an aspect of the present invention a set of user preferences are obtained by interrogating a real-time preference broker.

In accordance with an aspect of the present invention a user preference broker is set up with network connections to service providers, said service providers providing user preferences to said broker in a real-time bidding process.

In accordance with an aspect of the present invention a system and method whereby a mobile device acting as a Triggered device in an environment causes a representation of said environment to be created that contains a representation of the triggered device and its control API; furthermore, said control API being accessible from internal resources or from external resources.

In accordance with an aspect of the present invention user preferences are communicated to the triggered device using a human-curated interface; furthermore, commands are issued to representation of triggered device in said representation using a control API.

In accordance with an aspect of the invention a method is provided that discriminates between pluralities of items in an environment, said items being proximate to a triggered device.

In accordance with one aspect of the invention various user identities and handles of a user of a mobile device are associated with a triggered device.

In accordance with an aspect of the invention, based on a posteriori presence of triggered devices in an environment, cause messages to be generated and delivered to one or more users, identified by user identities associated with said triggered device.

In accordance with an aspect of the present invention a method to find relationships between words based on co-occurrence in large data sets, said co-occurrence creating a dynamic taxonomy of related words and expressions.

In accordance with an aspect of the invention an attribute-based query for retrieving data from a database wherein the attributes in a query may be substituted with other co-occurring attributes that are related according to said dynamic taxonomy; wherein said substitution may be done by an automated rule engine.

BRIEF DESCRIPTION OF DRAWINGS

FIG. 1-B depicts the basic idea of Mediated Representations of an environment.

FIG. 8 shows an example of an Occurrence table.

FIG. 9 shows an example of a Density Table.

FIG. 10C shows extrapolated paths for users in an environment.

FIG. 12 shows an example of predictions.

FIG. 13 shows an example of a training data set in ML technology.

FIG. 26 shows a user identification (John) being associated with a Triggered device.

FIG. 30 shows system deriving historical music related purchase data for John.

FIG. 34 shows the preferences derived by the system for user John.

DETAILED DESCRIPTION

Figure 1B:
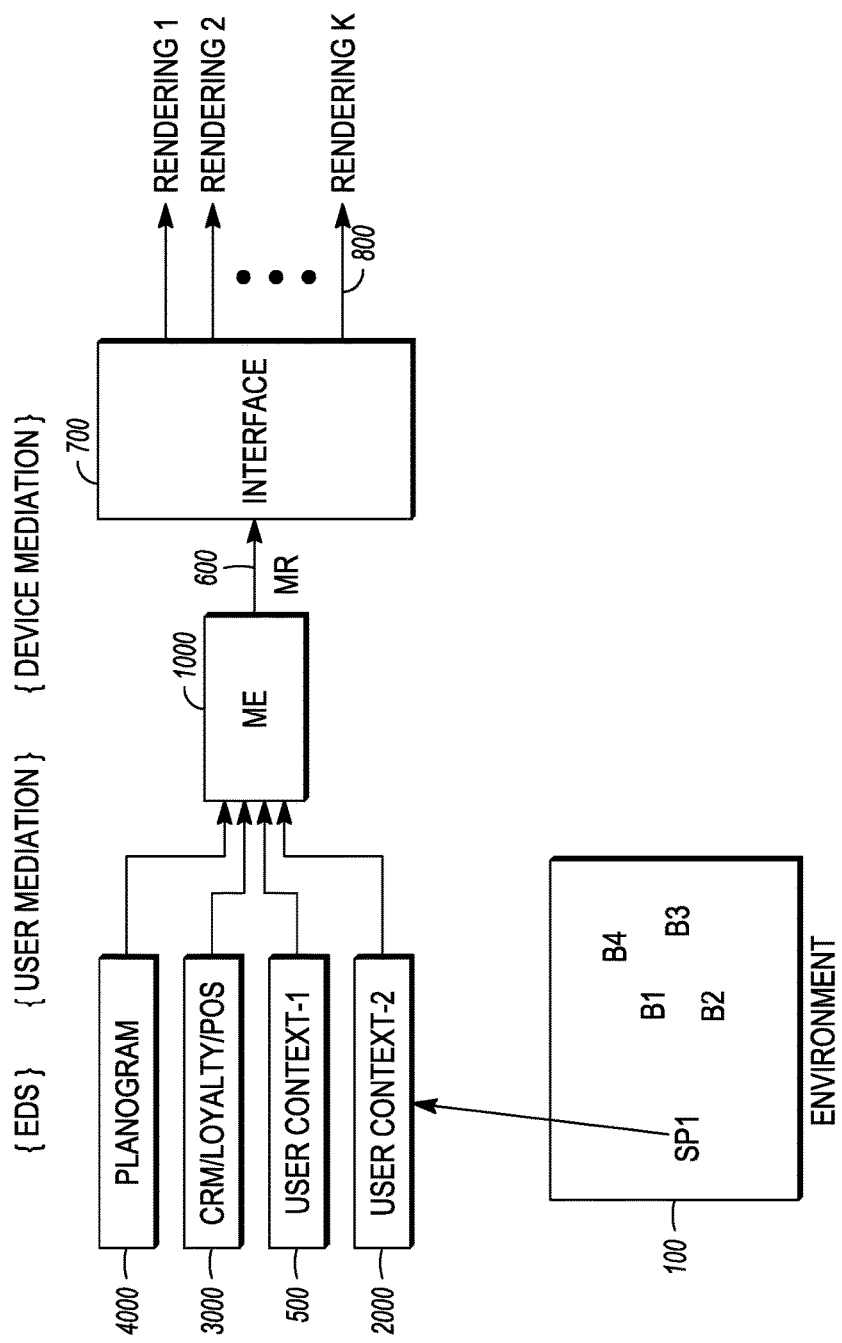
FIG. 1-A depicts the notion of environments with respect to a device.

The following detailed descriptions are made with respect to the various figures included in the application and may refer to specific examples in said drawings; however, it is to be noted that such specific cases do not limit the generality of the various aspects of the invention.

Certain figures included in the application describe Control Sequence Diagrams (CSD) that are intended to capture broad inter-system interactions; again, it is to be noted that generality of the various aspects of the present invention is not to be limited by evocations to such interactions as depicted by said CSD.

Additionally, certain figures pertain to a specific implementation of the present invention. These figures are included in the application to show a particular implementation of some of the concepts of the present invention and not intended to limit the generality of the various aspects of the present invention.

The present invention is based on the advent of devices with computational capabilities applied to physical space. This trend seems to have been started with cell towers installed for supporting mobile communications but also used for locating mobile devices in geographical spaces. Global Positioning Systems (GPS) further improved the accuracy of location identification. Smaller-sized cell tower technologies such as pico-cells, femto-cells, etc., have also been used for mobile communications and for location tracking in indoor spaces. Wi-Fi routers and access points have also been used for determining locations of devices. Recently, so-called "beacon devices" provide improved location tracking capabilities in indoor spaces.

More recent times have seen the introduction and installation of "smart" devices such as thermostats, refrigerators, clocks, etc., that broadcast signals that may be used for location tracking, making mobile devices (and hence their users) aware of the presence of the installed device/service. In some cases the installed devices may also have connections (wired or wireless) to private data networks such as the Internet.

An important concept in the above-mentioned devices is that they broadcast Radio-Frequency (R/F) signals that may be used by receiving devices for various purposes, e.g., to determine locations of receiving devices. In most cases the range of the signals is limited, e.g., in Wi-Fi and beacon technologies the range is of the order of hundreds of yards. GPS provides a bigger coverage area; however, its accuracy suffers in indoor spaces.

In one aspect, the present invention is concerned with devices that broadcast signals using technologies such as satellite based systems, tower-based cell systems (macro cells and micro cells), and Bluetooth or Wi-Fi-based routers, etc. Examples of such broadcasting devices include cell towers, pico and femto cells, GPS, Wi-Fi routers, beacon devices such as Gimbal, devices using the iBeacon specification, etc. We will refer to all such devices as Broadcast Devices (BDs).

As a mobile (receiving) device moves, it goes out of range of certain signals and comes into the range of other signals from BDs. Thus, at any given time, an area of geography may be determined wherein a receiving device is able to receive signals from one or more BDs. Such a coverage area may be referred to as an environment. That is, an environment is defined with respect to the receiving device and the particular BD from which it is receiving signals.

Consider FIG. 1-A that shows a geographical area under the coverage of a number of Broadcasting Devices (BDs) depicted as BD1, BD2, and BD3. A mobile device 100 is assumed to be moving from the left to the right of the figure and occupying locations "A", "B", "C", "D", and "E" successively. As it moves it may be in the range of signals being broadcast by some devices and out of range for other broadcast signals.

Consider the mobile device 100 in location "A" at some given time. The mobile device receives signals from BD1. We may define area 1000 as the area containing all those points at which the device 100 may receive signals from BD1. Areas such as 1000 are an example of an environment.

Now consider the mobile device in location "B". It receives signals from BD2. Its environment may comprise all points in regions marked as 2000-1 and 2000-2. As it moves to location "C" its environment extends to comprise region marked 2000-3, i.e., its environment now consists of regions marked 2000-1, 2000-2 and 2000-3. As the device 100 moves further to location "D" its environment "shrinks" to the region comprising 2000-2 and 2000-3 (its environment no longer includes region 2000-1).

In position "E" the device does not receive any signals from any BDs and its environment may be said to be null, i.e., does not comprise any locations.

It should be noted that if a mobile device is simultaneously receiving signals from two different BDs, then the mobile device is simultaneously located in two different environments, each associated with a different BD.

It should also be noted that an environment might not have a regular shape, e.g., circular or oval, etc. Rather, the shape of an environment is determined by its reception capability of the signals.

It should also be noted that no assumption is being made as to where the one or more BDs are installed within an environment. In particular, the BDs may be installed anywhere as long as their broadcast signals may be received within a geographical area. For example, GPS satellites exist in earth orbits but their signals are received at various geographical areas on the surface of the earth.

Mobile devices may receive the signals broadcast by BDs in a geographical area that defines the environment. Generally, mobile devices support applications ("apps"), and said apps may operate using data received from the signals transmitted by one or more BDs. In some cases the app must first register to receive signals from the one or more BDs. When the mobile device's operating system receives such signals, it makes registered applications aware of the receipt of said signals. In common usage, when applications are made aware of a received signal, they may relay said signal to one or more servers using a network connection to a wide area network, e.g., a cloud infrastructure, wherein the servers assemble the received data into one ore more datasets.

As used herein the term Environment Data Set (EDS) is a collection of data pertaining to an environment, received either from mobile devices in an environment or from external sources (e.g., sources external to the environment).

Certain new kinds of broadcasting devices integrate multiple radio broadcasting technologies and may also integrate video capture capabilities. For example, Brickstream has announced one such device that integrates Wi-Fi, Bluetooth and has an integrated video capture system. The device also has connections to private data networks. In future evolutions of such devices it is to be expected that the captured multimedia data may be stored in a private data network whose location is broadcast by the device in its periodic broadcast signals. Recipient devices may then receive the location identifier and cause the stored data to be accessed and gathered into one or more EDS.

A planogram is a diagram or model for describing the layout of items in an environment, in current usage most often a retail store. Thus, a planogram is a type of EDS in the sense that it is data about a physical retail store and its contents. It is usually available from external sources. Signal data gathered from mobile devices in an environment are another example of an EDS; in this case the dataset comprises data received by mobile devices from the BDs in the environment. In this example, the dataset my in fact be gathered in real-time.

An important concept in the present invention is that of mediation. The term mediation refers to manipulating one or more EDS with respect to user intent or user preferences.

For example, consider a user "John" in a retail store, say J.C. Penny®, said area of store comprising an environment, i.e., the geographical area of the store is such that John's mobile device may receive broadcast signals from BDs when said mobile device is in said geographical area.

The signal data from "John's environment" is one example of an EDS. A planogram describing the contents, i.e., inventory, and its layout is another EDS.

Given the two EDS as above, in one aspect the invention allows the mediation of said EDS according to John's intent or preferences, e.g., the EDS may be used to generate a representation, with suits being at the "top" of said representation because the system has inferred that John prefers suits or John intends to purchase a suit.

Using the same EDS, mediation for a different user "Alice", may yield a list of items, e.g., in the J. C. Penny cafeteria, in which edible items are prominent. In other words, mediation using the same EDS may infer different intents for different users, yielding different results.

The result of mediating one or more environment data sets (EDSs) of an environment is referred to herein as a representation.

Whereas the above example shows that mediation of one or more EDSs may cause some of the details of an environment to be deleted or removed from the resulting representation, in general, one or more details may be added, removed, highlighted, modified, etc. to a representation. An incremental mediation process is also possible wherein the user interacts with the representation and (e.g., explicitly) adds, deletes, modifies the contents of a representation in an interactive manner.

A second form of mediation may be referred to as device mediation. Typically, device mediation refers to taking a representation derived by mediation from one or more EDSs as input and manipulating it to produce a (second) representation that fits the needs or aesthetics of one or more devices. For example, the mediated representation of J. C. Penny's environment for John may be further mediated for John's smartphone device. Extending the example, said mediated representation might be further mediated for John's smart glasses as a holographic image or a 3-D representation.

This second type of mediation is also sometimes referred to as rendering.

Continuing with the above example, the first phase of the mediation infers John's intent ("shopping"). The second phase of mediation uses this inferred information and along with device specific information to render the information on John's smartphone device. As a part of the first form of mediation, a layout is chosen that is "consistent" with the inferred intent of the user. Thus, if the intent is "shopping" then a layout is chosen for a rendering that is consistent with a shopping intent. If the intent were "navigation" a different layout may be chosen. A Layout Manager module described later handles such decisions that are in concert with the inferred intent.

For terminological convenience we will sometimes use the expressions "environment" and "EDS" inter-changeably when the context makes the meaning clear. In other aspects we will use the explicit terms as needed.

The term transaction history, Point of Sale (POS) data, Customer Relationship Management (CRM), and Loyalty data, all refer to data related to customer retail purchases (physical or virtual).

As used herein, the term mobile device is a consumer device that serves as a communications device for voice and/or multimedia data and that provides computational capabilities. It provides connectivity to various networks including but not limited to private data networks, IP networks, Internet, wide area networks, the Cloud, Public Land Mobile Network, short range wireless networks such as Wi-Fi and Bluetooth, etc. Examples of mobile devices are smart phones, tablets, PDAs, smart glasses, smart watches, 3-D holographic glasses, virtual reality headgear, game controllers, etc.

It should be noted that certain mobile devices such as smart glasses and smart watches operate by associating themselves to the user's smartphone device using short-range radio protocols such as Bluetooth or Wi-Fi, etc. In such situations the present invention envisions that associated devices work as a single virtual mobile device. References herein to a "mobile device" thus refer to a single mobile device or a virtual mobile device that consists of associated devices. Thus, for example, a smart watch associated with a smartphone may receive broadcast signals in an environment and may make the smartphone or the applications on the smartphone aware of said signals, or vice versa. Similarly, representations may be rendered on the smartphone or the smart glasses, etc. It might be that a representation is produced that is further mediated to be rendered on two devices that differ in aesthetics or capabilities. For example, one device may support 2-D representations whereas the second device may support 3-D or holographic representations.

A mobile device may receive signals from one or more BDs. The hardware and/or operating system of said mobile device may respond to the signal/message by making certain applications running on said device aware of the reception of said signal(s). In this way the mobile device may be said to be responsive to the BD signal(s). As previously mentioned, in some cases a registration may be needed to allow this to occur.

A mobile device that is responsive to signals transmitted by BDs will be referred to as a triggered device.

It should be noted that not all mobile devices might be responsive to signal(s) from BDs. This may happen, for example, if no application on a mobile device registers for the signals of one or more BDs.

PREFERRED EMBODIMENT

In a preferred embodiment of the present invention a mobile device acting as a triggered device in a physical environment is responsive to the signals of one or more BDs and causes a first determination to be made of user intent, which results in a representation being computed and successively updated at a periodic rate. Furthermore, the triggered device causes a second determination to be made of relevant rendering devices. The resultant representations obtained using the first and second determinations may be made available continuously or periodically or in batch mode or as a data stream via suitable interfaces to various physical devices and computers. Representations may also be stored for later usage and retrieved as needed.

FIG. 1-B shows a preferred embodiment of the present invention. An environment (100) contains four (4) BDs indicated as B1, B2, B3 and B4. A mobile device (SP1) is present in close proximity to one or more of the BDs so as to be responsive to them. It, therefore, acts as a triggered device. SP1 has a network connection 2000 (wired, or wireless, or a combination thereof) and its data is gathered as a dataset "User Context-2" (200). The entities shown as 500, 3000 and 4000 are also datasets that together with dataset 200 comprise an EDS, E. The EDS E is connected to module ME 1000 (Mediation Engine). One or more representations 600 are generated in the user mediation phase, said representations being further mediated by device preferences 800 (also possibly provided to Third-Party Providers—TPP). Note that SP1 itself may be used as a rendering device.

First Exemplary Embodiment

Figure 2:
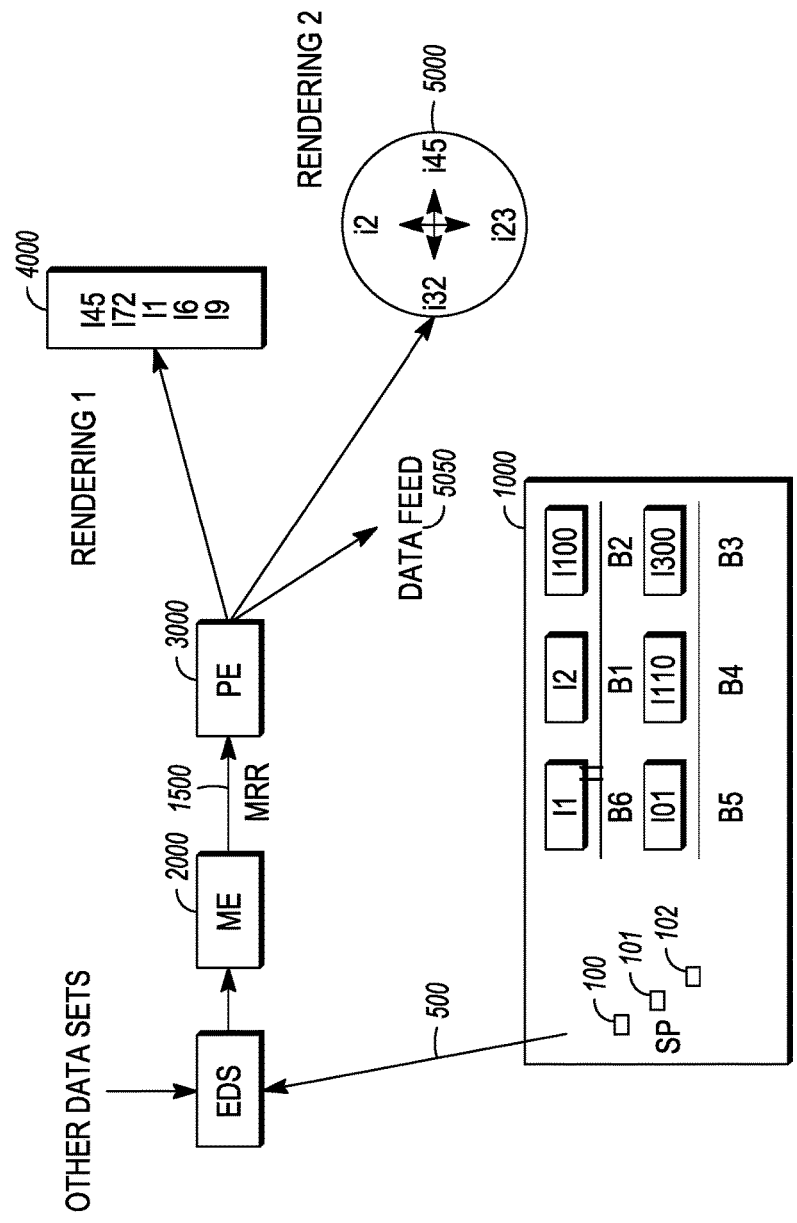
FIG. 2 shows a first Exemplary Embodiment.

FIG. 2 shows a first exemplary embodiment of the invention. The purpose or goal of this embodiment is to provide a search facility for the contents of an environment, which in this illustrative example is a retail store. A user 100 is carrying one or more wearable or other mobile devices such as smart glasses 101, smart watch (102), and a smartphone SP (triggered device). The user is walking in a physical store 1000, which contains BDs B1 through B6 and retail items I1 through I100 in aisle A1, and items I101 through 1300 in aisle A2. SP is connected via a wireless network 500 (FIG. 2) to a system for gathering data into a dataset comprising an EDS, E, that is in turn connected to module ME 2000. Said ME, using various inputs constituting the EDS, generates representation 1500 (based on user intent as detailed later) and mediates it further for two devices, i.e., produces two different renderings of the said representation, namely 4000 and 5000. These renderings may be delivered to mobile devices via module PE (Publishing Engine 3000) using the Public Switched Telephone Network, Public Land Mobile Network, wireless networks, wire-line networks, cellular wireless networks, private data networks, Internet, or combinations thereof, etc. These renderings may also be provided to TPP (possibly as a data feed 5050). In FIG. 2 the PE module is shown as separate from the module ME for didactical reasons; in practice PE may be a sub-module of ME.

Consider, by way of example, a retail store that has installed BDs and provided its planogram and transaction history as one or more datasets in one or more EDSs. A consumer or other user 100 carrying one or more mobile devices (triggered device), is visiting said store is. The location of the consumer within the store may be determined in a variety of ways. For instance, signals transmitted by the BDs in an environment are received by consumer's mobile device, acting as a triggered device. The signals contain signal strength indications, allowing the radial distance from the transmitting device to the receiving device to be computed, either by the mobile device itself or by a remotely located server with which the mobile device communicates.

ME 2000 determines, firstly, that the consumer prefers shopping, resulting in a mediated representation being generated. Secondly, a determination is made that the user wishes to use a particular device, e.g., his smartphone or smart glasses. A rendering is created for said user device. Said consumer perceives the physical layout of the retail store, i.e., physical environment using his biological senses. At the same time, the consumer experiences mediated representations of the retail store on his smart phone, which are generated by the ME 2000. The mediated representation may show, for example, store items sorted in order of the user's preference (as described later) and arranged in suitable manner e.g., as a vertical list with a suitable background layout.

Furthermore, the representations may be generated and/or updated at a periodic rate. Thus, the user 100 roaming in environment 1000 perceives new renderings on his mobile device periodically. It will also be noted that the periodic representation (and subsequent) renderings may be generated and/or updated without explicit commands from the user, i.e., the renderings may be "pushed" to the user.

In addition to the rendering presented on the user's mobile device, the consumer may also perceive a second mediated representation on his smart watch that shows a subset of the items in the store that another party (e.g., a spouse or celebrity) may prefer, arranged in a circular list with a different but suitable background layout. It is to be noted that if a representation is generated for another party (who is not physically present in the environment) then a stored representation may be used that has been previously generated and saved. Storage and subsequent use of representations will be detailed later. In those cases where the other party's representation is not available the user mediation process will fail and no representation will be generated.

Two noteworthy points are to be emphasized. First, the EDSs of the retail store are used to make a first determination of user intent, resulting in two distinct representations being generated from the same EDS, one for the consumer, and the second for the other party. The two representations are then individually manipulated to yield renderings that are suitable for specific devices and situations.

Secondly, note that in some cases the user mediation could fail to produce a representation. This should be contrasted with other situations (e.g., in map generating programs) that either assumes user intent by default ("navigate to a destination") or depends on user input ("enter destination"). In our case the user mediation phase is automatic and fails explicitly in some cases and succeeds in others. Moreover, the renderings are a function of and depend upon the previously derived user intent.

Second Exemplary Embodiment

Figure 3:
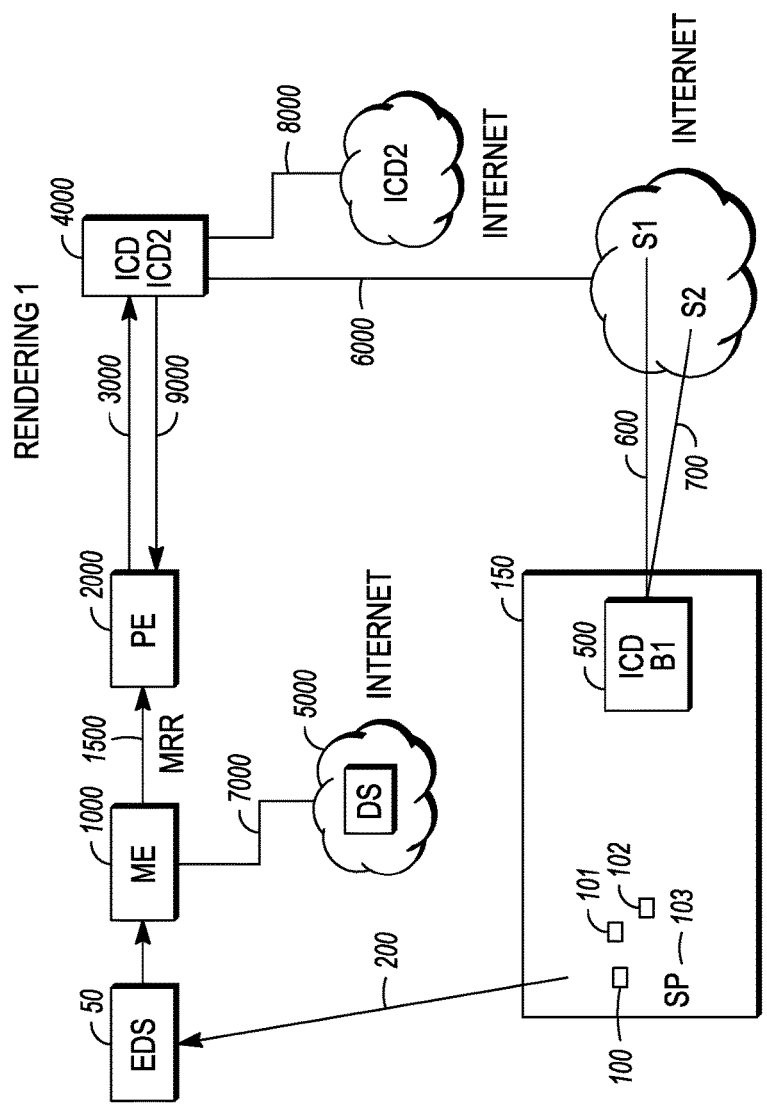
FIG. 3 shows a second Exemplary Embodiment.

FIG. 3 shows a second exemplary embodiment of the present invention. The purpose of this exemplary embodiment is to show mediation of resources and services for a consumer 100 in an environment 150. The consumer is carrying wearable smart glasses 101, smart watch 102, and a smartphone 103 (triggered device). Environment 150 contains an Internet Connected Device (ICD) 500, e.g., music player connected to the Internet. Two different Internet service providers S1 and S2 may provide music service to ICD 500 using interfaces 600 and 700 respectively. The dataset corresponding to the environment is EDS 50. The triggered device 100 is connected to the EDS 50 through network connection 200. Note that because the connection 200 may be relaying data in real-time from environment 150, the process of gathering the data into an EDS 50 may be a real-time process.

The ICD 500 is a special device in the sense that it combines two technologies, the Internet content rendering technology and broadcasting device technology B1. Whereas FIG. 3 shows the two technological components of the ICD 500 in one enclosure, actual physical construction may vary, e.g., ICD may be built by two or more interconnected components. FIG. 3 shows a functional architecture of the ICD rather than a physical realization of the functionalities.

A consumer within the confines of the environment, i.e., proximate to the ICD 500 that contains BD B1, perceives the manifestation of the ICD, e.g., the consumer hears the music being rendered on the ICD in the physical environment. At the same time, the consumer's smartphone, being responsive to the ICD B1, causes a representation 1500 containing a rendering of the ICD to be generated by ME 1000 and provided to PE 2000. Said PE renders the representation as rendering 3000 and includes the representation of the ICD in the rendering, resulting in a rendering on one of the consumer's devices, say smart glasses 101, as representation 4000. For example, said rendering may depict the ICD 500 as an icon which when "clicked" would expand into a graphical user interface to control the music track being played. Thus, the consumer perceives mediated representation 4000 on his mobile device while simultaneously perceiving physical reality through his biological senses. In other words, continuing with the above example, the user hears the music track being played (with his ears) and sees an icon of the ICD on his smart glass device with which he can interact.

The consumer may at this moment interact with the mediated representation 4000 being rendered on his smart glasses, e.g., by issuing a command "Start music service" (using the appropriate device-specific command) to his smart glasses 101. Alternatively, the user may use gestures in a holographic representation on smart glasses that result in controlling the device, etc. The command is conveyed to ME 1000 via the application that is rendering the representation on the smart glasses 101, i.e., the representation is active in the sense that it can receive commands and convey them to pre-determined destinations. In one possible implementation scenario, but not limited to this scenario alone, the smart glasses rendering application transmits said command to ME via the smartphone. ME 1000 connects to a Directory Service (DS) 5000 and requests a control interface (API) 7000 for ICD. ME 1000, using said control interface 7000, issues a command to service provider S2 to start music service on device 500.

In the above example, two consequences of the decision made by ME 1000 to service provider S2 should be considered. First, the music playing on the ICD 500 needs to be changed to the new track as directed. This may be effectuated, for example, by using a control API shown as 6000 in FIG. 3, by which the user's command to change the music is sent to the service provider S1 or S2 depending upon the user's choice.

Second, the representation that the consumer is viewing on his smart glasses should reflect said change, e.g., name of music track being displayed in the representation should reflect the change. The ME 1000 generating a new representation that is in turn published by the PE 2000 and rendered on the user's smart glasses 101 may effectuate this change. The stimulus for this new representation (or change in said representation) is the user command issued to smart glasses device 101 (said stimulus in turn relayed to EDS 50 and relayed further to ME 1000).

Thus, the command to the ME manifests changes in physical reality, i.e., the ICD 500, and the representation of physical reality, i.e., representation 4000.

Again, the PE 2000 and DS 5000 are shown as separate modules from the module ME for didactical purposes; in actuality, the implementation details may differ.

Third Exemplary Embodiment

Directory Services (DS) have a long tradition in computer networking. In fact the Internet itself uses the Domain Name System (DNS) directory that maps Internet resources, e.g., domain names, to their addresses. Another prominent example is the X.500 directory service for managing global resources in machines and people. As more ICD devices are deployed, it is expected that directory services will be needed and deployed as well.

As an example of an alternative embodiment the ME requests the DS 5000 in FIG. 3 to identify the discovered device ICD 500 and its capabilities. Using the information received from the DS, the ME requests a Real Time Broker (RTB)—not shown in FIG. 3 but discussed later—to provide a control interface for ICD 500. The RTB is assumed to be in communication with a service provider network. Said RTB negotiates with service provider network to obtain a control interface and supplies it to the ME. The ME then using its Publishing Module (discussed later) integrates the provided control interface into a representation that is then rendered on one of the user's devices. The user may then control ICD 500 by issuing commands to the application rendering the representation.

In another embodiment the ME may have in its internal storage a set of "well-known" control interfaces and the ICD 500 may be controlled by one or more such well-known interfaces. Alternatively, the ICD 500 may have in its internal storage a well-known interface that is identified by a list resident on the ME or by DS. In some cases the ME may need a key authorizing it to use said control interface and the DS or the RTB may provide such a key.

It is to be appreciated that increasingly music and other service providers for ICD-like devices encapsulate user preferences. Thus, it is to be appreciated that by issuing the above command the consumer may command the ICD to provide personalized service. In some cases the chosen ICD and its service provider will know the user's preferences. In other cases the ME 1000 may ask the RTB to provide the preferences of the user (this is detailed later). It is envisaged by the present invention that user preferences, e.g., in music, videos, food, etc., will be created and maintained by multiple service providers, in which case the ME and the RTB combine to act as a service broker for user preferences (detailed later).

Additionally, the user may wish to add an external device such as a different (virtual) ICD, namely ICD2, to the representation being rendered on his smart glasses, e.g., user wishes to add virtual device ICD2 to his representation that has a capability to render music videos such as YouTube player. It is to be noted that ICD2 does not physically exist in the external reality being directly perceived by the user. Rather, ICD2 may exist as a resource in an online network such as the Internet. The user issues a search request for such a device and issues a command to add said device ICD2 FIG. 3) to his representation. For example, the user may be shown the result of his search request as a list of ICDs and a selection is made. The selected ICD is then added by the rendering application with recourse to the PE; this interaction is shown as 9000 in FIG. 3. The PE updates the rendering using 3000 FIG. 3.

In summary, a user perceiving physical reality and a rendered representation of that reality may cause changes to be made in that physical reality, e.g., Internet services to be discovered and initiated in the rendered representation, and the actions of these services can be made manifest in the rendered representation. When an Internet service (or a device that provides Internet service, as possibly ascertained by inquiring from a Directory Service) is discovered, a Real Time Broker in contact with a service provider network, or the ME itself, may provide its control interface, and said interface may be included in a representation. A rendered representation containing such an interface may then be used as a control interface to control said device or service.

Fourth Exemplary Embodiment

Figure 4:
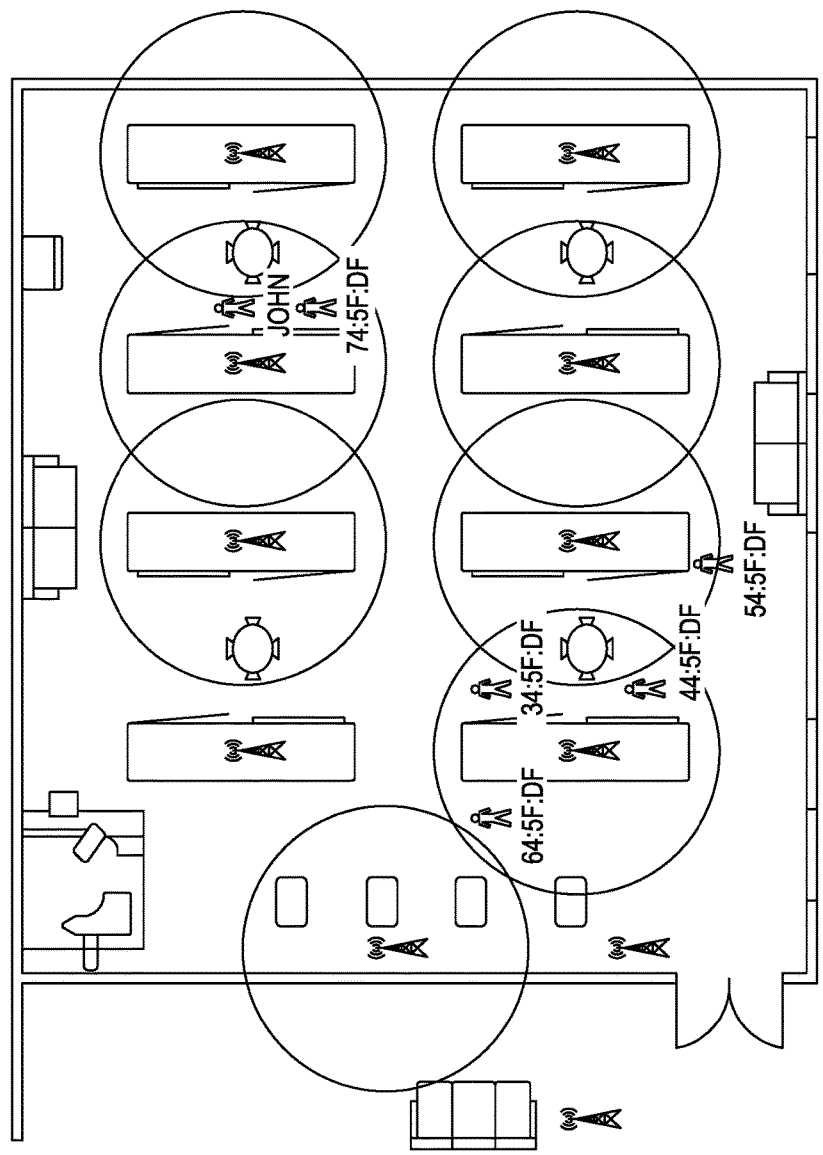
FIG. 4 shows an illustration of the fourth Exemplary Embodiment.

FIG. 4 shows a fourth exemplary embodiment of the present invention. The purpose of this embodiment is to show how the representations generated for a particular environment may be used by an enterprise to interact with its customers, provide and manage services, and to make its operations more efficient. FIG. 4 shows a representation of a retail store constructed from multiple environments, each associated with a triggered device. Thus, the EDSs consist of data related to the physical store (e.g., planogram), multiple customers CRM and loyalty data sets, and several triggered devices physically present in the retail store (i.e., data from BDs installed in the retail store and sent to the ME via the triggered devices). The data from the various environments, i.e., the EDSs, are combined and shown as a unified representation. The figure (representation) depicts aisles within the retail store and locations of mobile devices (carried by consumers) and proximity to BDs, etc. A series of such representations generated periodically may depict the physical goings on in the retail store.

One important aspect of representations is that they can be generated to contain information that can be automatically processed, i.e., processed by other computer programs without human intervention. For example, one may generate representations of the retail store in such a manner that a congregation of customers may be detected at a certain location in the store by a computer program that analyzes said representations, and an alert may be generated automatically to a pre-designated terminal or device, located in the store e.g., a manager's station. Similarly, a particular user moving in the store may be captured in a representation that also lists his preferences, i.e., items he is lingering by and which may be of interest to him, as shown in FIG. 4.

Various enterprises have utilized the online actions of users to gain commercial advantages. For example, online user actions such as click-throughs, number of visits to a website or time spent on a particular section/page of the website, frequency of visits to a website, etc., are computed and used to gain an understanding of user intent, interest and goal so that an enterprise may better market its wares.

Similarly, the physical movements of users in an environment may be computed and utilized to gain an understanding of user intent and interest as follows. Triggered devices receive broadcast signals in environments and, in turn, transmit said signals to servers in a server complex. The transmitted signals contain signal strength indications, allowing the radial distance from the transmitting device to the receiving device to be computed. Thus, the triggered device receives a succession of signals from one or more BDs and an analysis of said signals (using path loss calculations available for different broadcasting devices and their respective power consumption) can be undertaken (by the triggered device or the server complex to which the signals are relayed). In particular, one may not only compute the radial distance but also compute various user movements, which can be used to determine, by way of example, the user's proximity to certain items, how long the user has lingered by a certain item or at a certain location, how often a user has visited a particular location, or if a user is circling an item, etc. A record of user movements may be stored, indexed by device identification, location and time. One may refer to such a collection as a user movement repository or database.

Now consider by way of example a particular user (with a triggered device) at a certain location in a retail establishment. By analyzing the signals received by said user's device, we may compute a pattern representing said user's movements and compare said pattern to the stored patterns of user movements in the same location.

Thus, we may be able to infer that said user is lingering and for how long he has lingered at a certain location, perhaps proximate to certain items. This pattern of user movement may indicate user interest in said proximate items.

Moreover, said patterns of user's movements may be correlated with the stored patterns of other user's movements to gain a better understanding of user interest based on historical records of user movements in said location, e.g., people who lingered for more than two minutes at this location bought item X and then proceeded to buy item Y. Such information relating physical movements and actions of users and deriving information and predictions from a pattern of movements may prove invaluable to marketing enterprises.

In a later section of this specification we provide more details on the user movement calculus referred to above.

Fifth Exemplary Embodiment

The purpose of this embodiment is to show that representations generated for an environment can be used in multiple scenarios.

Scenario 1: We have a triggered device TD1 in environment E1. Agents "B" and "C" are remote human users, i.e., not present in environment E.

In this scenario, TD1 navigates the environment E1, receives signals from the environment and relays them to the module ME (1000) of FIG. 1-B. As described in the preferred embodiment above, ME produce representations for agents "B" and "C". Agent "B" saves the representations that it receives. Agent "C" receives a different representation than agent "B" and processes it according to his needs. Both the received representations contain representations of objects in the environment E; however, the objects represented in one representation may be different from the objects represented in the second representation. In other words, the representations are generated preferentially with respect to the agents who will be receiving said representations. In certain embodiments the agents may provide explicit descriptions of their preferences also to the module ME.

As another example of the use case of scenario 1, consider agent "C" viewing his representation and noticing a need to make a change, issues a command to a device being represented in his representation. Module ME (as described earlier) effects said change whereupon the device "TD1/user" might decide to alter its actions, e.g., change its route.

Scenario 2: In scenario 2, we may have a human agent "C" receiving a representation resulting from the combination of two environments from two triggered devices TD1 and TD2. The two environments may represent distinct physical locations or may represent two different points of view of the same location. Actions ordered by agent C are then made manifest in both points of view simultaneously and the corresponding representations reflect said changes. In such cases where different points of view in one or more environments are integrated and rendered into a representation, it is possible to derive 3-D representations and multi-point or Point-of-View (POV) representations.

Scenario 3: In scenario 3 we have a user in a retail establishment that is in the coverage area of one or more BDs. The user has a triggered device that is responsive to the signals. Using the EDS from the environment we may produce a succession of representations that show the items that may be of interest to the user within the environment, the placement of those items in said environment, and the directions to said items.

Scenario 4: This scenario is a modification of scenario 3, viz., the user states his interest in certain items and a succession of representations is generated that shows the placement of said items of interest in the environment, directions to said items of interest, and possibly other items that may be of interest to the user based on his stated interest in certain other items. In other words, the user is to be provided with the ability by the present invention to state his preferences through a human-curated interface. Such an interface is discussed in detail in a later section of this document.

Scenario 5: This scenario is a further modification of scenarios 3 and 4 above. The user in this case is outside the store but is within range of the BD signals, i.e., the environment ranges over several miles, e.g., the environment may be a result of signals comprising GPS signals in combination with short-range signals such as Bluetooth or Wi-Fi.

In this scenario the system makes a first determination of user intent as to finding the retail establishment and then, as further information (in the form of additional or newer data sets relating to the environment) becomes available, the system updates the user intent to find items of interest in said retail establishment. Correspondingly, the representations generated a posteriori are different from those that are generated for the initial intent. It may thus be stated that the representations are a function of the EDS, said function being time-dependent i.e., the system may give priority to one or more EDSs at any given instant.

Scenario 6: In this scenario the user is in a retail store and the system makes a determination that the user is interested in a car seat. As described above, a representation is created that includes a representation of a car seat, say in the form of an icon, and renders the said representation on a mobile device, say a smartphone, of said user. The iconic representation of the car seat has an associated control API (as described in the third and fourth embodiments) that may be used to find further information about the product, e.g., its price may be determined by clicking the iconic representation.

It is envisioned by the present invention that one of the options available through the control API would be to edit the iconic representation of the product, e.g., change its color, or specify a size, etc. If the retail store supports 3-D printing an option could be provided to "print" a customized version of the product while the customer is waiting in the store through the control API of the iconic representation of said object. Alternatively, the user may be able to direct a command to a third-party 3-D printing shop to render, i.e., effectuate, said printing.

Thus representations of objects in a representation may be manipulated, edited and the manipulated objects may be rendered using 3-D printing processes.

It will be appreciated that the above scenarios are presented as exemplary embodiments and different combinations are possible that lead to many other embodiments.

Sixth Exemplary Embodiment

Figure 5:
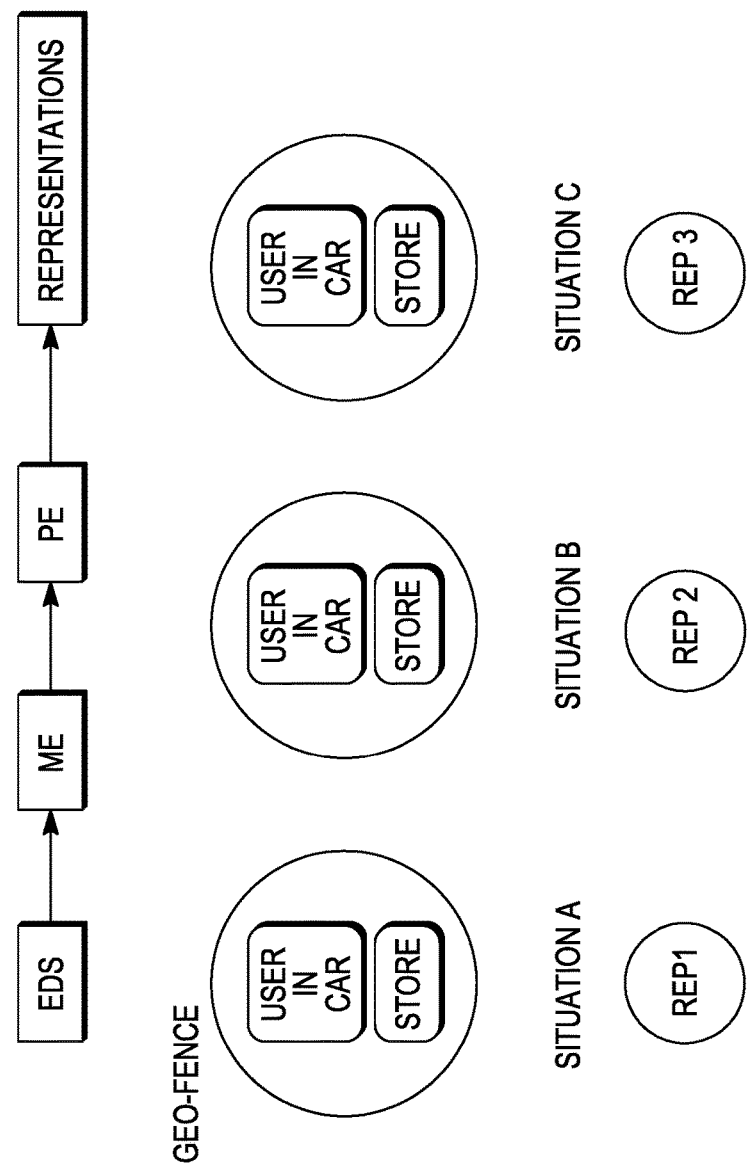
FIG. 5 shows a sixth exemplary environment.

The purpose of this embodiment is to show more details of the user mediation phase. Consider FIG. 5 that shows three instances A, B and C of a geographical area demarcated by a geo-fence 200 surrounding a physical retail store that contains a BD. An automobile is parked within the geo-fence. A user "John" with a triggered device is inside the automobile. The figure shows the same user "John" in three different situations, A, B, and C.

Consider situation "A". The triggered device receives broadcast data from the BD in the store and relays it to the server complex wherein it is gathered into an EDS 1000 and made available to the module ME 2000 (as explained in earlier embodiments). Based on the EDS, the ME mediates a representation of the EDS, assuming certain user intent. Assume that the system infers said intent to be "John wants to go shopping". The representation for said intent is then rendered on John's device. It may transpire that the rendering decision is to send a "push" notification to John.

Now consider the same user John shown in situation B that differs from situation "A" in one aspect, viz., the car has one or more BDs installed in it. Assume John's triggered device is also responsive to the BDs installed in the car. In this case module 1000 gets a new EDS (the triggered device is receiving data from the BDs in the store and the car). The module ME generates a representation from the EDS corresponding to situation B and this representation is rendered on John's smartphone. But in this situation the user inference and rendering may be different (the system may infer that John intends to go home and a "map" rendering is generated for John's device). The difference may be attributed to the change in the EDS ("presence" of car due to the BD signals) thus causing a different inference of user intent to be made by the module ME.

Finally, consider situation C in which the car is installed with BDs, i.e., situation C is identical with situation "B" except that the ME module 2000 has been modified (as explained later). In this case, the EDSs for situation C are identical to the EDSs for situation "B". However, the representation generated for John and rendered on his smartphone may be different than the representation generated in situation "B" due to the system making a different inference such as "John intends to watch an event on YouTube" (while sitting in the car). The difference in this case may be attributed, not to a change in the EDS, but to one or more changes in the ME system itself.

As explained later, the ME system uses a set of rules to prioritize its inferences in any situation. The system in general makes multiple different inferences, some of which may be contradictory to or more general than other inferences. The prioritization scheme may be thought of as a meta-rule system that arbitrates and selects inferences in multiple-choice cases. As an example, in situation "C" the system chooses an inference "John wishes to see YouTube" over "shopping" because John's user preferences may have changed, said change being made by John explicitly or because of some other action that John may have taken, said action being recorded in the system's internal memory (but which cannot be a part of any general EDS dataset because it is a personal preference).

Finally, it is important to note that the system allows and accepts explicit statements of user intent and renders representations based on such statements. An explicitly stated user intent generally overrides any internal inferential capability of the system. In the absence of stated user intent, the system's functioning is determined by a first user mediation phase and a second device mediation/rendering phase, the latter being influenced by the former.

Description of Main Modules/Functions

The various embodiments described above and the detailed descriptions and figures that follow do not limit the scope of the invention and are thought of as illustrating and explaining various aspects of the invention and its embodiments; the actual implementation may differ in various ways. Therefore, the scope of the invention is contained in the claims attached herein.

Figure 6:
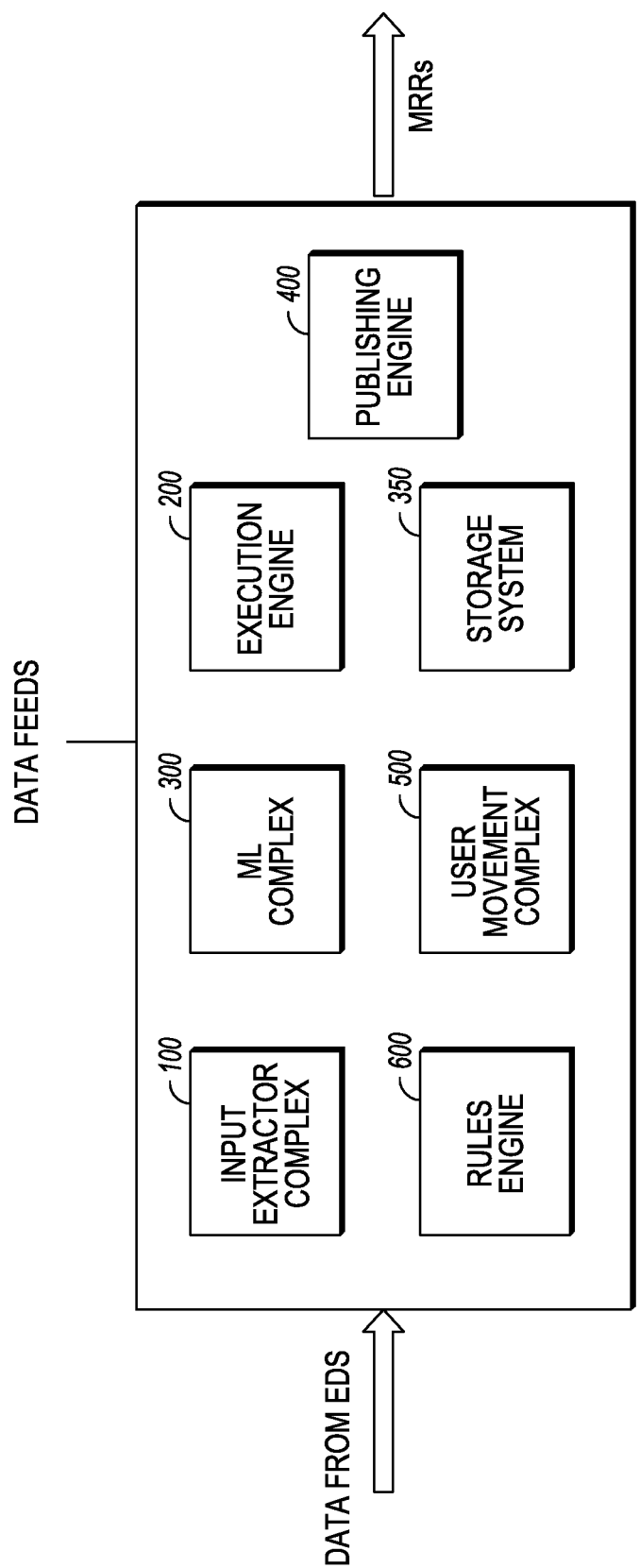
FIG. 6 shows main components of system.

We now describe the internal workings of one example of the ME 1000 of FIG. 6. In this example the ME 1000 includes seven main modules, Input Extractor Complex 100, Machine Learning (ML) Complex 300, Execution Engine 200, Storage System 350, User Movement Complex 500, Rules Engine 600, and Publishing Engine 400.

Input Extractor Complex

Before describing the Input Extractor Complex 100, FIG. 6, it is necessary to describe certain conventional data mining techniques. Such data mining describes a collection of words or items such as [Cheese, Bread, Coffee] as a Basket or a Transaction. Given a large collection of baskets these techniques show how to train ML algorithms on that collection of baskets such that given a partial or empty basket, the algorithm can predict likely items or words that can be added to the partially complete or empty basket. The term "likely" refers to probabilistic measures that may be interpreted as "certainty factors" or "correctness" of the predictions.

Figure 7:
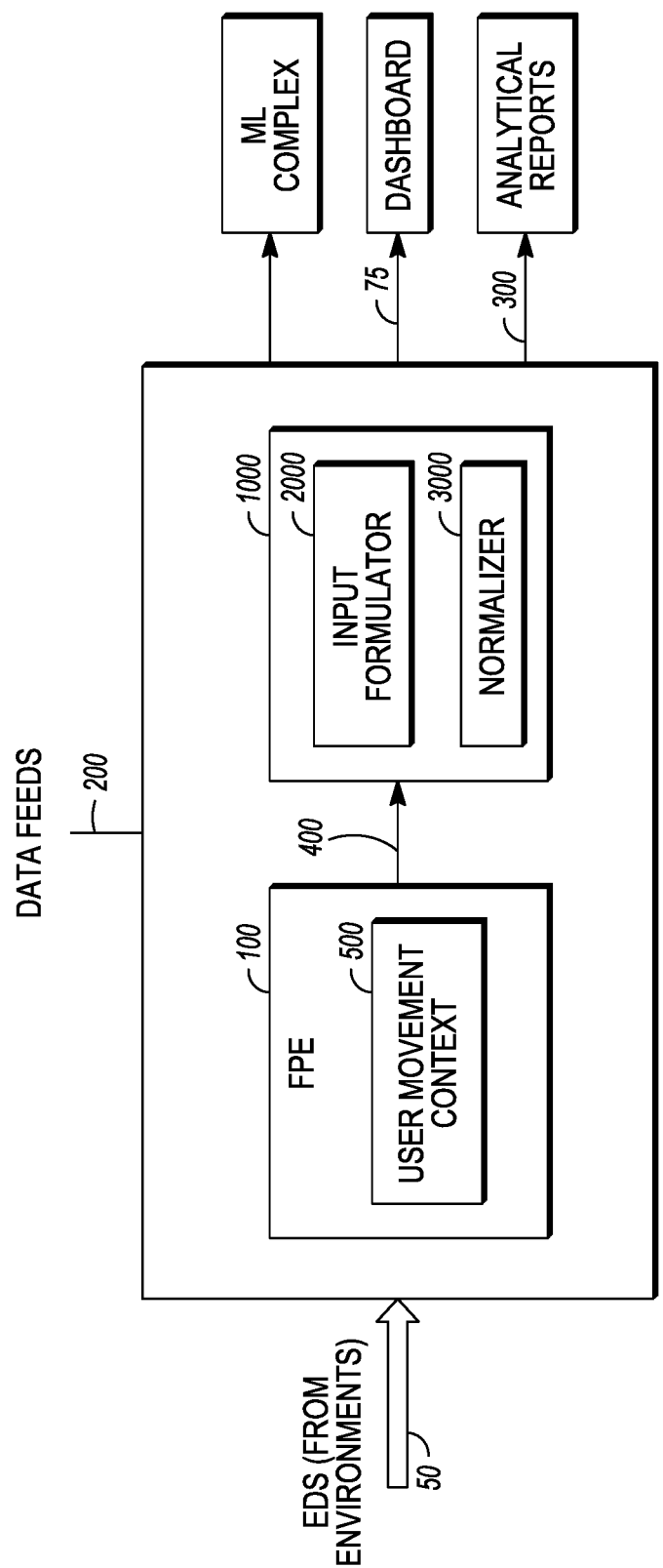
FIG. 7 shows architecture of Input Extractor Complex.

FIG. 7 describes the architecture of the Input Extractor Complex (IEC). A Feed Processing Engine (FPE) 100 receives input from multiple EDS of one or more environments 50. It also receives input from a number of data feeds 200, e.g., CRM, web context, user context, and social context. In some cases the data feeds may be obtained by utilizing a user's credentials such as his Facebook credentials. In other cases the data feeds are available through data providers under commercial arrangements, e.g., Twitter. Certain feeds such as web and user context are special cases and are detailed below. The FPE 100 may also receive a Planogram feed. FPE 100 processes the incident data feeds and may make certain results of its processing available through interface 75 to create a Dashboard or analytical reports 300.

We now describe the internal components of the Feed Processing Engine (FPE) 100 (cf. FIG. 7).

Social Feed

We now describe the processing of the Social Context Feed by exemplary illustrations of Facebook status messages and Twitter messages (tweets). Status messages and tweets are multimedia messages consisting of text, videos, photos, etc. Tags that are words describing the content of the associated objects often accompany the photos, videos and other such visual/textual objects. In a first step the FPE extracts the text and the tags, deletes "useless" words, e.g., prepositions, and creates a single basket of words for each tweet or status message. A chunk is a pre-determined number of baskets collected from a feed. Given a chunk of baskets, the FPE trains a certain mechanistic process. Once trained the procedure can be given a certain word in a partially filled basket and it will "complete" the basket by adding likely words to said basket. This process may be referred to as the social inference interface. FPE 100 provides the social inference interface to module 1000 through interface 400 (cf. FIG. 7).

User Context Feed

As mentioned above the user context is a special case of a data feed. It comprises messages from the BDs within the environment and may have the general form

[DevID, MajorID, MinorID, Registration Time, data, reference, etc.]

"DevID" is a unique identifier serving to identify the particular BD, MajorID and MinorID are other identifiers used to identify the device further or its placement information, and Registration Time refers to the (universal system) time that the message is generated. The "data" attribute refers to multimedia data that may be contained in the message, or referenced by the attribute "reference", i.e., the multimedia data may be stored in a location referenced by "reference". BDs that are capable of capturing video of their surroundings and transmit the captured video as a data object to a recipient device provide an example of a BD generating multimedia data. Note that not all BDs will have this capability. Given two or more BD messages from the same BD we can compute a "dwell time" for a particular device by taking the different Registration Time events of successive BD messages. When a particular device leaves the BD coverage area, i.e., fails to re-register for a pre-determined interval of time, the "dwell time" computation for that device can be terminated. The dwell time computation yields baskets of the form

[Device ID, linger time, Beacon ID]

indicating the amount of time spent by said device in proximity to said BD. As before such baskets of dwell time transactions may be used to train machine-learning algorithms. Thus, given a basket containing a particular device and a particular BD, the ML algorithm will predict how much dwell time is likely for said device proximate to said BD. This will be referred to as a "linger time" inference and is provided by FPE 100 to the Input Formulator 1000. Thus, individual dwell time data is used to predict "linger-time" estimates for a particular environment (and related BDs in said environment).

It will be appreciated that linger time is only one illustration of user behavior based on his device's environment that can be inferred from BD messages. For example, we can compute the number of previous visits to a given BD by a particular device (user), said previous visits during the same day or a specified number of days, e.g., in a week. From a BD perspective we may compute or infer the "hot BDs" as those BDs that see the most linger time from devices. We may compute or infer the "Busy BDs" as those that see the most devices in a given time period, etc. Thus, a variety of user behaviors may be captured by such computations and inferred and provided to the Input Formulator 1000.

CRM Feed

The CRM data feed is usually a custom feed that is provided under commercial arrangements. We expect the schema of this feed to be available and known. The schema information can be used to identify the particular attributes that are of interest and attribute values made available to the IFC 1000 through interface 400 as the CRM inference. For example a CRM field containing the attribute "Product Name" with values "iPhone", "Android", etc. can be made available as a basket to the IFC 1000.

Feed from Wearable Computers and Mood Considerations

In addition to data received from environments (as detailed above), the user context may also include data derived from a mobile device. Many manufacturers have announced wearable computers and devices that contain sensors as do present day smartphones. One of the functionalities provided by the sensors in these devices is to gauge and measure the physical state of a user, e.g., his blood pressure, his heart rate, body temperature, pulse rate, etc. This data may be collected and collectively referred to as personal parameters or mood vector. Wearable devices using Bluetooth Smart technology define Generic Attribute (GATT) profiles that define a group of attributes for various applications. For example, the health profiles HRP, HTP, GLP, BLP etc., define several parameters such as heart rate, blood pressure, temperature, etc.

In one aspect, the present invention envisages that wearable computers and smartphones that contain sensors will provide personal parameters (GATT profile parameters) of users as a data feed to the IFC. The IFC in turn will store and save for later use such personal parameters for known users indexed by the spatial and temporal coordinates of users. For example, a list of personal parameters such as

[p1, p2, p3, p4, etc.]

may be indexed by time "t1" and location "(x,y)" within an environment. Along with user purchase data, such data is well suited to be used in machine learning technology. The indexed data set and purchase data (as discussed above) is made available to the ME by the IFC.

The ME calculates various types of inferences as detailed above. One kind of inference it makes is called a prediction. This kind of inference is sometimes referred to as collaborative filtering. In such inferences the idea is that the algorithm predicts the decision of an individual user based on collective decisions made by groups of other users. Typical example of such inferences is the statement "People who bought this item also bought that item".

The present invention envisages the use of stored personal parameter data in the inference process. Consider a user in location "(x,y)" for whom the ME has made certain inferences based on linger times and/or other such data. As described above the ME also generates a list of predictions for said user's future decisions, e.g., the user will also like that item. These inferences use collaborative filtering algorithms from ML technology. The rationale for this assertion is provided by the observation that personal parameters are an indication of a person's mental and physical state and a discernible trend indicated by personal parameters in a large number of users at that location is significant for a single user's decision making process.

Web Data Feed

The web context feed is based on converting a web page to a basket of words. The conversion may be accomplished as follows. The method is based on constructing two different types of tables of data. The first table is the frequency of occurrence of words occurring on a web page, i.e., source text. For example, if the source text contains the sentence "The quick brown fox jumped and jumped and jumped over the fence" then the frequency counts of the words in the sentence would be as shown in FIG. 8.

The second table is the intra-word-occurrence-distance that is computed by counting the number of words that separate two sequential occurrences of the same word. In the sentence above, namely, "The quick brown fox jumped and jumped and jumped over the fence" the word "the" occurs twice and the two occurrences are separated by 9 words, the word "and" occurs twice with a distance of 1, and the word "jumped" has three occurrences with separating distances of 1 and 1. Thus, a table can represent the intra-word-occurrence-distance is shown in FIG. 9.

Using (normalized) standard deviation (or other Fisher-style statistical tests) the method derives the "significance" of a word in the source text based on the frequency (occurrence) count and the density of occurrence, i.e., smaller intra-word-occurrence-distances. The crucial assumption in density calculations is that words that occur with high density and high frequency are more significant. A threshold value of significance is determined, through simulation and experiments, and words whose significance exceeds the threshold are retained. Alternatively, a pre-determined number of top-ranked words, by significance, may be retained. In various embodiments of the present invention it is envisaged that the words on a web page may be pre-filtered to remove nonsense words, misspelled words, obscene words, or commonly occurring words and prepositions such as "I", "it", "she", "and", "but", etc. The retained words are collectively referred to as a "fragment". In the present invention the term "fragment" will denote a collection of information elements, derived from the original object and is deemed to capture significant aspects of the original object.

Fragments extracted from a web page represent what may be termed as the significant words on that page. It is to be noted that we do not claim that this method extracts ALL significant words. It may well be that the above-described method fails to locate certain significant words contained in a page. Simulations and calculations have shown that our method produces a large percentage of significant words. It is an aspect of the present invention that a certain amount of inaccuracy is built into and admitted into our system and its methods.

In certain cases we may wish to seed a fragment with known information. For example, suppose we agree that words beginning with the digits "12", or words that contain the three character string "XYZ" need to be considered as significant words. Other examples may include special words such as user identifiers as used in computer accounts on websites or email names, etc. In such cases we modify the method described above as follows. We associate a pre-determined frequency and a pre-determined distance with such words and add them to the frequency and distance tables derived by the method described above. In this way the specially designated words enter into a fragment.

The FPE processes a web page as described above and converts it into a fragment. Each fragment is considered as a basket. Given a large collection of web pages each web page may be converted to a fragment and treated as a single basket. Such baskets may be used to train ML algorithms as detailed above. A trained algorithm may then be given one or more words, i.e., a partially empty basket, and asked to fill it with other words that are inferred to likely exist in said basket. This is provided as a web inference to the IFC 1000 via interface 400.

We pause the ongoing exposition to describe two additional examples of the web data feed. Firstly, consider a database containing the data shown below.

[android, sally at gmail dot com, . . . ]

Suppose we pose a query "return the value of second item if the value of first item is "android". We would expect the response to be "sally at gmail dot com". However, suppose the query asked is "return the second item if the value is "iPhone"?

Conventional query processing systems fail to answer the latter type of queries because "android" and "iPhone" are treated as distinct entities.

However, using the method of co-occurrence and other techniques described above, we may create a basket containing "android" and ask the system to complete the basket as described above. If the completed basket contains "iPhone" then an unconventional query system may return "sally at gmail dot com" as a response to the latter query above because the system infers a relationship between "android" and "iPhone".

A query language based on the above principles would provide great flexibility and economy of expression, at the same time providing enormous expressive power. A long-standing problem in query languages is that related terms may not be used inter-changeably. The techniques described above provide a way to dynamically discover related terms, i.e., create a dynamic taxonomy.

Secondly, an important problem in online networks is that users have many handles, addresses and user identities (userid). It is hard but extremely useful if a number of different handles, addresses etc., can be identified as belonging to a single user. (This problem has been referred to as user identity management.) One way to solve this problem is through the technique of dynamic taxonomy described above. Given a large data set of pages containing userids, addresses and handles, we may use the technique of co-occurrence to find those userids that are more correlated. Thus, one such basket that may emerge could be depicted as follows.

[sally at xyz dot com; sally-morgan; sally123; ip-addresss:192.34.56.78; . . . ]

Such a basket with a high correlation value would indicate a high likelihood that all four userids contained in the basket belong to the same person, e.g., Sally Morgan.

When a mobile device is triggered by BDs in an environment, and the triggered device transmits signals received from the BDs to one or more servers, the transmitted information may contain a unique device identifier (TDID) generated by the triggered device. The TDID for a device may be associated with the highly correlated baskets as described above. Thus, TDID=123 may be correlated with Sally Morgan and all her other userids.

Planogram Feed

The Planogram feed represents one way of providing the FPE with a description of a physical environment, e.g., in current usage planograms detail retail environments, but there are not necessarily limited to retail environments. In retail environments, the Planogram feed provides the locations of the BDs, the layout of the store and the inventory of the items within the store (on the shelves or aisles). The Planogram feed is processed by the FPE to construct the layout of the retail environment for use in a representation to be generated. The inventory of the environment is provided to the IFC 1000 for its internal use.

The present invention envisions the use of planogram-like formal description languages to be used in describing non-retail physical spaces and establishments also. In such cases the formal descriptions may be used to generate the background layout corresponding to the environment under consideration. For example, (as will be detailed later) if the user intent is inferred as "going home" and the EDS has a planogram for the geographical area where the user invokes the service then a suitable map-like layout may be chosen that facilitates navigation.

User Movement Context

Before describing the User Movement Context 500 (cf. FIG. 7) we need to discuss certain conventional techniques. These techniques show how to set up a geo-fence or install various types of short-range signal transmitting devices such as, Gimbals, etc. These techniques also show how to monitor a smartphone device (or how a device can monitor itself) as it enters or exits a geo-fenced area. It is also known how a mobile device receives one or more signals from a BD and makes an application (App) running on a smart phone aware of said signal/message. Alternatively, the mobile device may transmit said received message to a server connected to the smartphone device via a wire-line or wireless network such as the Internet, Wide Area Network, or the Cloud. Finally, as previously discussed, it is known how to determine the radial distance separating the recipient device and the transmitting device using signals transmitted by BDs and received by recipient smart phones. The signals contain signal strength indicators that allow the radial distance to be determined by said recipient devices (or by servers connected to said recipient devices).

In the physical world certain consumer movements are known to be indicative of intent or interest (purchase or otherwise). For example, a consumer lingering by a retail item may be taken to be interested in said item (prompting perhaps a salesperson to approach them). As another example a consumer who is known to return to a specific retail item's location over a pre-determined amount of time may be taken to be potentially interested in said retail item. Cues based on consumer movements are used by salespeople in retail stores and by many people in other walks of life.

However, knowledge of user movements in certain locations and proximity to other items are merely heuristics and not grounded in data. They are rules of thumb and salespeople and merchandizers learn such rules over many years. Moreover, their knowledge may be specific and local to a neighborhood. For example, a ten minute linger time in one location may not be significant with respect to interest in a certain retail item whereas a five minute linger time may be significant in a different location or with respect to a different retail item. It is thus the correlation of locales, items and customer behavior that is learnt by sales people and merchandizers.

In an embodiment of the present invention, user movements and locations, proximity to items and POS/CRM/Loyalty data, are all used to train a machine to learn said correlation so as to predict said consumer's intent. The resulting predictions are grounded in data driven rules and the learning function can be tuned to multiple locations and/or items.

Once a user intent has been predicted or learned by the system it may be used to take actions in the physical environment (e.g., send an offer to a customer in a retail store) or saved for later use (e.g., re-target a user at home in an online interaction, for example, by showing him an advertisement related to his inferred intent). Thus, if a user lingered by a car seat for children in a retail establishment, he may start seeing advertisements in his mobile browsing sessions or on his apps.

Linger Time Computation

Figure 10A:
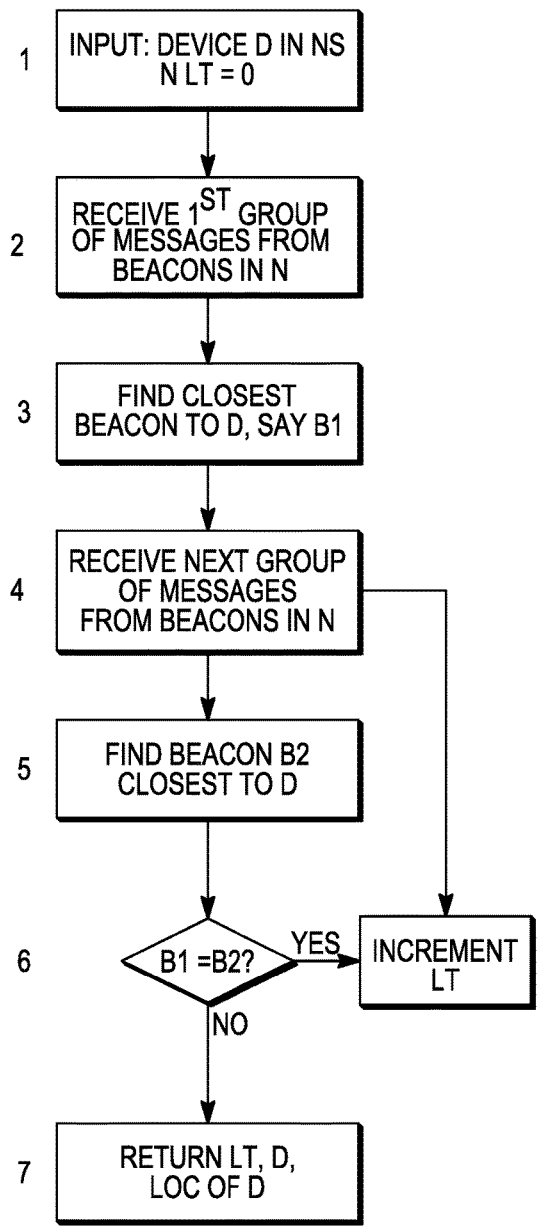
FIGS. 10A and 10B show the method for computing linger time with respect to proximity.
Figure 10B:
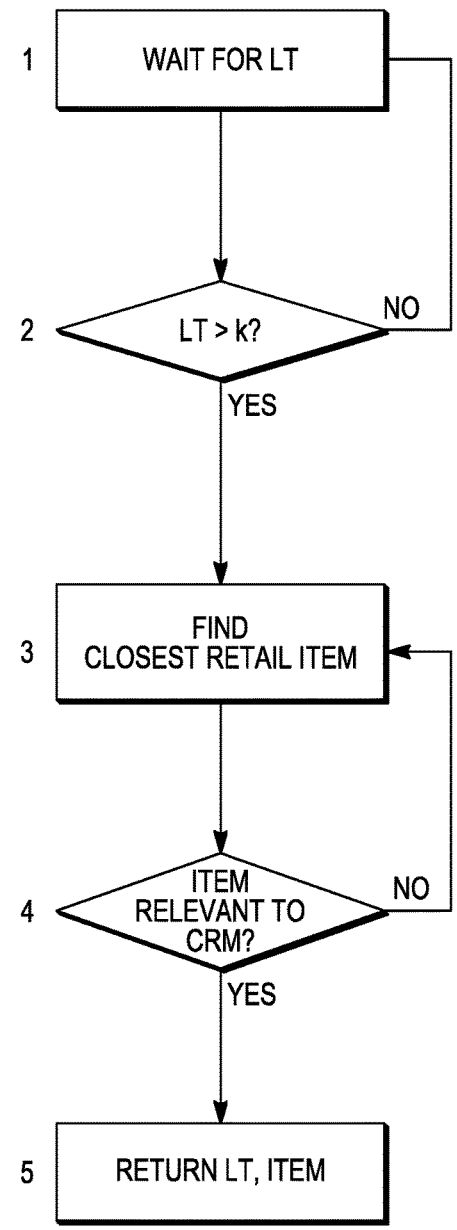

FIG. 10 shows a method to estimate the "linger time" of a consumer with respect to a retail item within an environment. The figure shows two inter-related methods, 10A and 10B.

Method 10A:

In step 1, a user D is identified whose linger time is to be computed. A counter LT is set to zero.

In step 2, a first group of messages is received from users' mobile devices (responsive to BDs) within the environment.

In step 3, the signal strength information in said received messages is analyzed to determine the closest BD, say B1, to the given user D.

In step 4, a next group of messages is received.

In step 5, the closest BD B2 is determined from the next group of received messages received in step 4.

In step 6, a determination is made if the BDs B1 and B2 are the same device, i.e., B1=B2. An affirmative answer results in incrementing the LT counter and resuming the method form step 4. A non-affirmative answer results in the current LT counter value being returned.

Method 10B:

In step 1, the method waits until a user D, its LT value and its location (Loc) are received whereupon it proceeds to the next step.

In step 2, the LT value is determined to exceed a pre-determined and configurable limit, K. If it is less than "K" the method resumes its wait state.

In step 3, using a different signal received via a different input stream, viz., the Planogram signal, a retail item is located that is proximate to the location "Loc" of the mobile device D.

In step 4, using signals from CRM/Loyalty contexts a determination is made if the retail item is "relevant". A non-affirmative response results in the method being resumed at step 3. An affirmative response returns the values, D, LT and item.

Thus a user's movements may be inferred from an analysis of the messages received from the user's mobile device as it moves around an environment. The methods to associate a user identity with a device are conventional and do not need to be discussed further.

The above-described methods identify retail items that are located proximate to the location of the user. Whether an item is proximate to a user may be determined in any of a variety of ways that may depend on such factors, for instance, as the nature of the retail (or other) environment, the type of items involved, the BD technology employed and the placement of the BDs within the environment.

In one illustrative implementation the retailers themselves may specify a maximum distance between an item and a user that is to be used to determine if a user is proximate to an item. This information may be provided, for example, along with or in the planogram. In another illustrative implementation the user may be deemed as being proximate to an item if the user is within arm's length of the item (e.g., a few feet) or within viewing distance of an item (which may vary from case to case).

In yet another implementation the maximum distance between an item and a user that is to be used to determine if a user is proximate to an item may be based on the BD technology that is employed. Specifically, this maximum distance may be equal to the maximum distance separating the user and the BD beyond which the signal loss between the two prevents proximity calculations from being performed with a desired degree of accuracy. For small beacons that may be located within or adjacent to an item, this distance may be on the order of 3 feet. For example, if the beacon employs Bluetooth, the Bluetooth specification includes a Bluetooth Proximity Profile that recommends certain parameters such as proximity not be calculated if the path loss exceeds a preset limit. For other types of beacons this maximum distance may be greater than or less than this distance.

Repeat-Linger-Time Computation

Repeat-Linger-Time refers to the movements of consumers who linger with respect to an item in an environment and then linger a second time with respect to the same item within a pre-determined amount of elapsed time from the first linger event, i.e., repeats the said linger event within a pre-determined amount of elapsed time.

Furthermore, user movements may be stored for later use. Associating user movements with items at various locations and positions, allows for historical trends to be discerned wherein user's who frequent, for example, a certain location follow up by frequenting a second location. Or, people who linger by one item may also linger by another item.

As will be appreciated, the methods to compute linger-time and repeat-linger-time are exemplary methods based on analyzing messages received from mobile devices when entering, exiting or moving within a NS. Linger-time and repeat-linger-time methods represent consumer movements captured within an environment and many such movements may be captured in a similar manner and similar methods defined along the lines indicated by the two exemplary methods described herein.

To summarize, a user's various positions in an environment as determined by BDs may be extrapolated to derive a path through said environment of said user. Such a path may reveal patterns of movements. For example, if we consider, for exemplary purposes, a two dimensional environment (X,T) where "X" denotes position and "T" denotes time and we plot the user's extrapolated positions as "connected lines" then we may see patterns such as shown in FIG. 10C. The extrapolated movements of user 1 show him returning to the same location in an environment within a certain time interval, whereas user 2 is seen to remain stationary with respect to a location. Finally, for user 3 we may infer that he is circling a certain location over time.

It is envisaged by the present invention that such patterns of user movements will be stored in memory of the system and made available for retrieval as needed. Once a pattern is detected for a given user, say John, the system compares John's movement pattern with patterns stored in memory to determine the type of the pattern, i.e., linger time, repeat visits, hovering, encircling, etc.

It should be noted that matching a detected pattern with stored patterns is a heuristic process whereby success is determined by approximation-based techniques returning a number of possible matches and selecting one from a plurality of such returned matches.

Once such a determination is made the system compares the detected pattern with the patterns of other users in terms of collaborative filtering (discussed later) to determine if the detected pattern is significant. This is more fully explained in later section under machine-learning technology.

Once a pattern is selected and its significance has been determined using the above techniques, the system determines if there are items in the environment proximate to the location of the user's movements. Note that more than one item may be located proximate to the location of a user's movements. It is envisaged by the present invention that the system uses previous purchase history of the user, previously known data about the user, the items purchased by past users in said proximate location, said user's social context and web context, etc. By finding commonalities across all such information, the system narrows the plurality of items to a few items and selects them as the object of the user's interest. This is captured by the illustrative method described below.

Consider a user whose movements are detected by the system as being of significance at a certain location in an environment. Let the user be at position "X" and the items proximate to said position be "A", "B" and "C". For example, if the environment is supposed to be a retail store its shelves would contain several items and thus most locations in the aisles would be proximate to several items. We need a method to select from a list of proximate items those that are most likely to be of interest to said user.

[Procedure: Proximate-Likes]

We are given a user "U" at location "X" and a planogram of the environment containing location "X".

Find all items proximate to location "X" by referring to the planogram of the environment. Call it the "proximate list".

Find the web context, social context and purchase history context of user. Recall that each of these contexts is a list of "keywords" derived as described above.

Take the intersection of all the context lists, i.e., find the common set of words in the context lists. Call it "comW". (We can think of the set of words in "comW" as the items that the user most likely likes according to his various user contexts.)

Take the set of items from the proximate list; let us call it "Z".

Using the web inference method described above in the web data feed section, generate the top-ranked words correlated with the items in set Z. Let us call it "topZ". (We may think of "topZ" as the most likely set of items the user likes based on his movements.)

Intersect "topZ" with "comW" and retain the top-ranked set of words.

The result of the intersection in step 6 is the most likely items the user likes based on his proximity and movements.

The reasoning behind the above method may be stated in simple terms as follows. If a user's online (web, social and past purchase) context is replete with the mention of a certain item and he performs statistically significant movements in an environment context then it is likely that the user is interested in the set of items that are common in his movement and online contexts.

Input Formulator

Once the FPE has processed various data feeds (as detailed above), it provides its results to Module 1000 via interface 400 in FIG. 7, including data from the User Movement Complex. A sub-module Input Formulator 2000 within Module 1000 performs the task of assembling various data sets received from the FPE into a data structure that can be made available to the ML Complex (described later). Such a data structure may be visualized for didactical purposes as a (large) table containing multiple columns and rows. Each row corresponds to a single user/mobile device. In certain embodiments the system described in the present invention may utilize external mechanisms (not described herein) to infer a user identity from mobile device data or other kinds of data attributes such as email addresses, device UDID, IDFA, etc. The columns correspond to attributes or facets, each attribute being derived from the various input data streams. Some attributes or facets (sometimes also called features), for example, may be environment name, BD, linger-time, dwell time, mood vector attributes from a GATT profile, purchased items, purchase item price, etc.

Module 1000 contains a sub-module Normalizer 3000 that provides as needed capability for improving the efficiency of the subsequent ML procedure and also managing the size of the table sent as input to the subsequent ML Complex. As has been described earlier (cf. FIG. 1-B, FIG. 5) the Input Extractor Complex (IEC) receives several inference contexts such as web inference context, the user inference context, social inference context, and the CRM context. Each context comprises a collection of words/tags that are obtained by various techniques described above in the FPE module. The received set of words (contexts) is used to generate facets or attributes as input to the ML Complex. However, the received set of words is likely to contain similar or equivalent words, i.e., words describing the same item or similar items.

The Normalizer 3000 provides solutions to such problems that may arise within a certain inference set or across inference sets. For example, consider the words "iPhone", "smartphone", "iPhone 5S", and "apple phone". To a human all these words may appear to refer to the same item (at least they can be considered as similar items). A machine does not know this fact. The Normalizer 1500 helps by providing empirical proof of such similarity by using the basket [iPhone] and asking the web inference set to complete the basket. If the response from the web inference feed contains [iPhone, iPhons5S] with a high likelihood then the two words are "related". Thus, the Normalizer module 3000 serves to disambiguate between similar words by using empirically derived co-occurrences of words across a very large sample, viz., words gathered from a large number of web pages. The Input Formulator 2000 uses the Normalizer module 3000 as needed to normalize the various data feeds that the former receives.

Each feed that is provided to the Input Formulator 2000 is used to generate components within one or more representations as follows [Procedure Inf].

Use the key attributes (obtained from the Inventory schema) to obtain the corresponding values for the key attributes. Take the web inference feed and intersect it with the key-value inventory feed. This yields the set of common items that are inferred by the web feed and are contained in the inventory of the environment.

Use the key attributes (obtained from the Training data set schema information) to obtain the data values of the key attributes of the Training Data set. Intersect the key attribute values with the CRM inference feed items and with the Inventory values of the NS. This yields the set of common items that are inferred by the CRM set and are available in the Inventory of the environment.

Use the key attributes (obtained from the Training data set schema information) to obtain the data values of the key attributes of the Training Data set. Intersect the key attribute values with the Social Feed inference words with the Inventory values of the environment. This yields the set of common items that are inferred by the Social context and are available in the Inventory of the environment.

Take linger time inferences of a user (device) and obtain a list of items that are in close proximity to the BD where the user lingered (from the Planogram feed). Intersect the list so obtained with the inventory items of the inventory. This yields the list of items available in the environment that the user likes based on his linger time statistics.

Each of the four steps detailed above result in a set of items that constitute predictions of what a user will like, in a given environment derived from a particular inference feed. This may be depicted as follows.

Web Inference Feed: [Item 1, Item 2, etc.]
CRM Feed: [Item 3, Item 2, etc.]
Social Feed: [Item 1, Item 4, Item 5, etc.]
Linger Time Feed: [Item 1, Item 4, etc.]

Each list of predictions above may be used to construct a particular representation or the individual lists may be combined to construct one or more representations as needed or specified by policy, user commands or commercial arrangements.

The list of predictions generated by the Web feed, CRM feed, Social feed and Linger Time calculations may be further strengthened by using each group of predictions as input (plus additional data) to mechanistic machine learning (ML) procedures to generate new predictions. This produces incremental groups of predictions. This aspect of the present invention is discussed next.

Machine Learning Complex

In some implementations an external module comprising Machine Learning technology and providing machine learning, user preferences, or recommendations may be used. Third party providers or a network of providers may provide such services. In these cases, a properly formulated input comprising training data and input data are provided via a control API to the third party external service provider.

Figure 11:
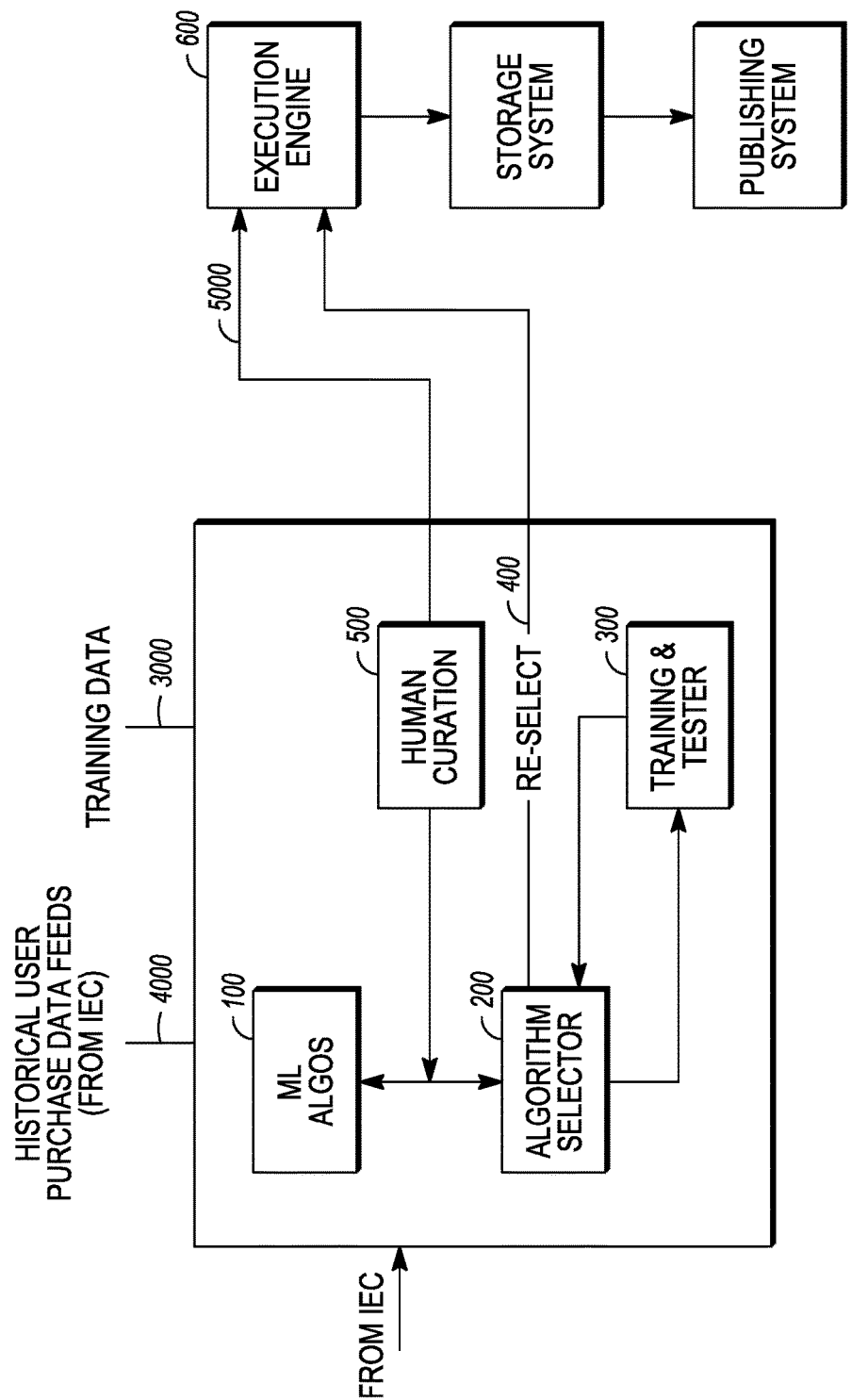
FIG. 11 shows details of the ML complex.

In some implementations the Machine Learning (ML) Complex may be another primary component of the overall system of the present invention. FIG. 11 shows the internal architecture of the ML complex. Module 100 contains several ML algorithms such as Gradient Descent, Kernel Classifier, Collaborative Filtering, etc. Each of these known algorithms is suited to certain kinds of data sets. Module 200 (Algorithm Selector) contains rules encoding which application to choose for a given kind of data set from Training Data Module 3000. Module 200 uses schema information provided by Training Data Module 3000 to make its selection. A Human Curation interface 500 is provided when Module 200 fails to make a selection (or if explicit input is needed or given by a user to state his preferences). Module 300 (Algorithm Trainer & Tester) may indicate via interface 400 that the selected algorithm is unsatisfactory, e.g., because certain ML algorithms may not terminate or converge on certain data sets. The Algorithm Trainer & Tester Module 300 uses the Training Data from Module 3000 (Training Data) that takes input of historical transactions (and/or choices, likes, dislikes, etc.) via 4000 from IEC. In some cases the environment data provider, e.g., the retail establishment or a third party data provider, provides the Historical User Purchase Data to the IEC that in turn processes said data and provides it as Historical User Purchase Data Feed 4000 (FIG. 11). Once the selected algorithm has been trained and tested it is provided to the Execution Environment module. The IEC (cf. FIG. 7) constructs the input data to be fed to the ML Complex. The ML Complex (FIG. 11) gives the selected and trained ML algorithm and the input data to the Execution Engine 600, FIG. 11. The Execution Engine executes the input algorithm on the input data and gives its results to the Publishing Engine, FIG. 11.

The following steps detailed below describe the working of the ML Complex whereby it produces input for the Publishing Engine 400 of FIG. 6.

Select a ML algorithm that is suitable for the given schema of Training Data using an internal rule set. The rules are of the form "if schema has data attribute A of type X and data attribute B of type Y then choose Gradient Descent algorithm".

Format the given transactional data to a Training Data Set.

Use the given Training Data to train and test the selected algorithm. If the algorithm does not converge in a predetermined and configurable number of steps or if the testing produces inaccurate results, flag the algorithm for Human curation.

Use the formatted Training Data set and the given description of the environment, e.g., Planogram, to construct the input data.

Provide the input data and the selected and trained ML algorithm to the Execution Engine.

Provide the results produced by the Execution Engine to the Publishing Engine.

Consider the list of predictions shown in FIG. 12. The list shows three groups of predictions. The first group, titled "Past", is based on "past" history of the consumer's purchases. The second group of predictions, titled "Linger" is based on the first group of predictions ("Past") with additional information obtained from the linger-time computation about the user's movements. Finally, the third group of predictions, titled "Beacon", is based on machine learning procedures that utilize the previously computed group of predictions "Past" and "Linger" along with preferences and purchase behaviors of other consumers.

The present invention uses the ML complex to generate representation(s) that are personalized to particular consumers. The representation(s) are generated for a particular user by utilizing and basing the generation of the representation(s) on the user's preferences, said preferences being derived by mechanistic procedures (as detailed above) or explicit input from user(s) via the Human Curation sub-module 500 shown in FIG. 11.

In a particular form of known ML algorithms, called Supervised Learning, algorithms start with a data set usually called the training data. FIG. 13 shows an exemplary data set related to music tracks. The first four rows of data in the table comprise the training data and the final row is an example of the algorithm being asked to make a prediction. The columns of the table are typically referred to as attributes or features, thus the training set has 5 features "Artist", "Duration", "Genre", Number of Months Released", and "Explicit". The sixth column of the table represents the desired output variable, in this case "Like/Purchased". In Supervised Learning situations it is assumed that the algorithm is always provided correct training examples (positive or negative, i.e., likes or dislikes). However, not all features may have values, i.e., there may exist features with missing data values, e.g., the value of the feature "Number of Months Released" for Debussy (Row 3) is missing or unknown.

Once a Supervised Learning algorithm has been trained on a training set, the algorithm can be asked to apply the learnt function to input data. The 5th row of the table in FIG. 13 shows an example of input data that could be fed as input to the Learning algorithm after training. A successful result would occur if the algorithm terminates with a Yes/No prediction. Typically, after training the algorithm is tested for accuracy of predictions on sample input data. One conventional rule of thumb suggests using 80% of the training data to train the algorithm and the remaining 20% to test the correctness of its predictions.

Finally, the Human Curation module has two main functionalities. The first group of functionalities is to determine how to influence the ML algorithms in those cases when automated methods fail. The user is allowed to terminate an ongoing process, select a different ML algorithm or supply additional data to rectify errors.

The second main group of functions is that human agents may state their preferences, likes and dislikes, etc. This allows the Human Curation module to create a data structure that may be used to bypass the machine learning phases and use the human input in the Execution Engine directly. This is shown as API 5000 in FIG. 11.

Additionally, the Human Curation module may provide input facilities to more than one human agent. For example, consider scenario 2 (described earlier) in which we have a human agent "A" roaming in a retail establishment while human agent "B" is in a remote location. (We are ignoring the third human agent "C" described in scenario 2, in this example.) In this case either of the two human agents "A" or "B", or both, may provide explicit input of their preferences to the ongoing system's operation. Thusly, the predictions generated by the system for human agent "A" are in principle different from the predictions generated for human agent "B" because they both may have different preferences. We use the term "preferential predictions" for this phenomenon.

The format for the input of a user's preferences may be chosen from a wide array of well-known methods. For example, we may use a spreadsheet for stating a user's purchased items, prices paid, where bought, etc. The schema for such data will vary based on the domain of the service. For example, for a retail environment we may use prices of items, items bought, previous items examined but not bought, etc. In a virtual game environment we may use a schema consisting of number of times the game has been played, previous scores achieved in the game, monsters killed in previous sessions, etc. In extra-terrestrial environments a schema might include distance from earth, choice of locations, altitude/depth from a reference point, amount of time spent at a location, etc. We may also define a protocol to send such spreadsheet data to the Execution Engine. Because both the Execution Engine and the Human Curation input module are internal systems (without any external dependencies), they can be customized to operate together in harmony for specific environments and human users.

Rules Engine

In general, the ML Complex described above generates all preferences for a particular user. In practice, however, many predictions cannot be accepted as they may have internal conflicts or may be irrelevant to the user's situation at hand. The purpose of the rules engine is to prioritize the generated preferences and to select the top ranking preferences.

The prioritization scheme is based on inferring the situation of a user. Various situations correspond to typical activities that users engage in, such as shopping, walking, inactive, running, etc. The various feeds discussed earlier such as the web context, the wearable sensors feed, and the feed from the sensors inside a mobile device are used to predict the likely situation of a user. The predictions are based on a collection of rules of the form "antecedent" implies "consequent" where the antecedent is a conjunction of "conditions" based on information derived from incident data feeds and the consequent is a descriptor for a situation, such as "shopping", walking, etc. An example of a rule is If sensor 1 shows motion and sensor 2 shows speed of motion to be less than 3 mph then situation is "walking", etc.

Given rules such as this a user may be determined as being in several situations. Heuristic reasoning is then applied to determine the most likely "situation" for the user. Alternatively, a precedence-relation can be used. In such relations, by way of example, "walking" may have a higher precedence than "shopping", etc. Thus, a precedence-relationship may be used to select one situation from several different likely situations.

Other examples include rules that use the frequency of predictions ("this user is often in such situations"), mutually exclusive situations (user cannot be "stationary" and "walking" at the same time), etc.

In summary, the Rules Engine operates as a two-phase system. In phase 1 the system predicts a given user to be in certain likely situations and in the second phase the system uses techniques to select the most likely situation from the predicted group of situations.

Once a user is determined to be in a particular situation, a determination can be made as to which representation is to be selected, e.g., if a navigation representation or a retail representation, etc., is to be used. Previously, this selection of background was mentioned in the context of choosing a layout for a given situation, e.g., choosing a retail planogram for depicting the layout of the store, or choosing a navigation layout for route-finding, etc. The Publishing Engine needs this information to mediate the chosen representation for device preferences.

In practice the Rules Engine works as a subordinate module of the Execution Engine. For didactical purposes it is described as an independent module of the system; however, efficiency details require that the execution of the Rules Engine be interleaved with other processes executing in the Execution Environment.

Storage System

Once a set of preferential predictions has been derived for a user (or agent), they are stored in a particular Storage System (SS) from where the data is accessed by the Publishing Engine (PE) for creating specific representations.

We base the inter-operation of the Execution Environment (EE) 600 (FIG. 11) and PE as a set of asynchronous (producer-consumer) processes working on a common (shared) storage system module SS. The EE produces data that is stored in the SS. The PE accesses the SS for its needs (detailed later). Thus, the EE is the "producer" and the PE is the "consumer". The timing of the "production" and the "consumption" is not related, i.e., the two processes operate asynchronously. The producer process may be thought of as a "writer" and the consumer process as a "reader" in simpler terms. Moreover, the writer process is greedy in the sense that it accesses SS whenever it has data to write; however, the reader process is constrained by the clock rate.

Thus, in some implementations the requirements for SS are as follows.

The number of writes far exceeds the number of reads in any given time interval.

The SS needs to provide consistency and fault tolerance across the entire address space.

Allow Efficient Range Queries.

To this end the SS may use, for example, an abstract toroid address space. The address space of the torus is split into partitions without overlap and the partitions are contiguous so that the entire address space is covered. Each partition may have a partition manager and only one partition manager.

The torus address space of a torus is defined as follows. Let "c" be the radius from the center of the hole to the center of the tube, and let "a" be the radius of the tube. Then the parametric equations for a torus azimuthally symmetric about the z-axis is $x=(c+a \cos v)\cos u$ $y=(c+a \cos v)\sin u$ $z=a \sin v$ for $u,v \in [0,2\pi)$.

For a given space, the SS defines multiple partition managers, m1, m2, etc. A data item is mapped to a point in the address space under a certain manager. Care is taken to evenly distribute the data items across partitions so that the partitions are evenly balanced. Periodic re-balancing may be needed. Thus each partition manager is responsible for a region (range) of the torus space). Efficient retrievals are now possible as an entire range can be returned when queried.

If there is a failure in one of the partitions, we need to expand the nearest two partitions to take responsibility for the data items in the failed region. Thus the neighboring regions expand. This expansion may necessitate a re-balancing of the regions.

It should be noted that no restriction is placed by the torus abstract space on the physical distribution of storage nodes; the latter could be distributed over a large geographical area.

Publishing Engine

Once the ML complex has derived its predictions and stored its results in the Storage System, the overall system is ready to render one or more (preferential) representations.

Figure 14:
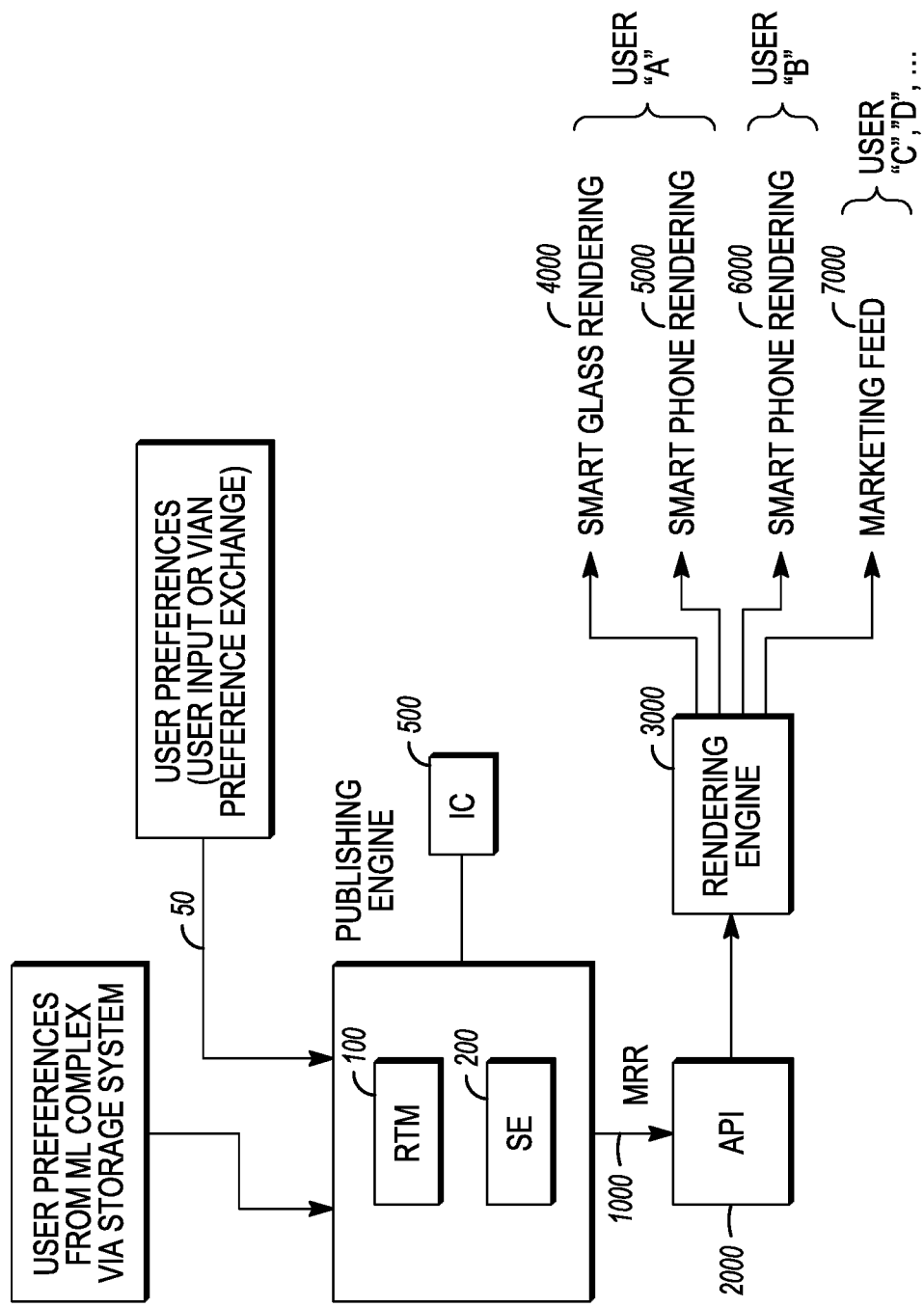
FIG. 14 shows details of the Publishing Engine.

We now describe a particular rendering module called the Publishing Engine (FIG. 14). Generally, the publishing process takes stored data (the user intent and preference predictions) in SS and creates one or more (preferential) representations for given devices such as mobile smartphones, tablets, desktops, etc. This has previously been referred to as the device mediation phase. The user preferences for a particular user may be provided explicitly by user input through a human-curation interface, or through the ML Complex that stores preferences of the user's of the system. A user's preferences may also be obtained from a preference-exchange mechanism discussed later (see input 50, FIG. 14).

Moreover, device-specific representations are produced at a rate governed by the Internal Clock IC (500) that is a global module available to all components of the system.

In further enhancements of the preferred embodiment of the present invention more than one representation may be generated and maintained contemporaneously and simultaneously made available via the SS.

It is envisaged by the preferred embodiments of the present invention that the generated representation(s) are influenced by and made specific to individual consumers and their devices, i.e., they are personalized by user intent and user device. Indeed, it is envisaged that, on occasion as controlled by system policy or consumer request, two or more personalized representations corresponding to the same or different individual consumers may be generated, maintained and provided concurrently and simultaneously. Furthermore, the representations may be stored, saved and provided at a later time or used in conjunction with other representations.

It is also envisaged by the present invention that one or more evolving representation(s) may, in turn, influence the external environment (the physical representation or virtual representation that they are representing) and the result of this influence will be manifest and perceivable in said representation. A consumer may influence physical reality by controlling devices or components being represented within one or more representations.

FIG. 14 shows details of the Publishing Engine and the representation publishing process. The components Script Engine 200 (SE) and Real Time Mixer 100 (RTM) will be described later. In FIG. 14 the inference lists generated by the Execution Environment (cf. FIG. 12) and stored in the Storage System is one of the inputs to the Publishing Engine. User preferences may also be input directly by the user or obtained through a preference-exchange network. The representation 1000 that is published is made available to rendering engines 3000 to render different representations across one or more devices. For example, we may have two different renderings 4000 and 5000 for a single user (John) who has two devices, viz., Smart Glass device and a Smartphone device, a different rendering 6000 for another different user (Alice) with a Smartphone device, and yet another rendering 7000 for users who wish to utilize a data feed.

It was mentioned in the above example that the Publishing Engine, working from a single representation, creates two representations for two distinct users John and Alice. This implies that the system has access to the preferences of John and Alice (said preferences being instrumental in creating distinct user preference representations). In order to create representations that are preferential to John and Alice, the system must have access to their preferences. Such preferences may be provided to the system by several means. First, the human-curation interface discussed earlier allows explicit input of a user's preferences. Second, the system and the methods of the present invention as described above derive and store the preferences of users who have registered and used the service before. Finally, as is described later, various service providers are expected to know a user's preferences (e.g., a music service provider may know a user's preferences in music) and such service providers may participate in a preference-exchange broker system. This aspect is discussed in detail later.

To further illustrate the publishing process with respect to the preferred embodiment, it should be noted that the overall goal of the representation being generated is to facilitate discovery and control of the contents of a given environment. The discovered contents in the environment are sorted in the user's preference order. This situation is analogous to that of an Internet Search Engine that produces a list of web pages in response to a user inquiry. The list of pages is then displayed as a dynamically generated web page rendered by a web browser. The Publishing Engine may use Typography and Layout modules for preparing the object to be published. The Publishing Engine may receive layout and typography information from subscribers (subscribe-publish model) or such information may be provided to the Publishing Engine by internal resources.

In certain embodiments the present invention may thus be characterized as a search engine for environments that contain triggered devices; said device being triggered by signals emanating from devices installed in said environment. As more devices are installed to provide services to customers in physical environments, e.g., retail shops, airport terminals, etc., the need to control, manipulate and utilize such devices will become increasingly important.

Using certain embodiments of the present invention, representations of physical environments can be generated; said representations containing representations of devices providing services in said environments. Such representations may then be controlled and the services may be utilized by interacting with said representation, much like online users utilize online services by interacting with web pages.

In the present invention certain items in an environment are discovered and their representations are created. The methods that create the representations are aware of a user's preferences via the ML Complex, and shape the representations accordingly, i.e., representations are preferentially biased. The Publishing Engine publishes these representations using device specific information, so that said representations are capable of being rendered on various physical devices.

In a situation analogous to dynamically created web pages, the Publishing Engine may use Layout and Typography Modules to create a representation. However, several aspects of publishing a representation distinguish it from the analogous situation of dynamically constructed web pages.

Firstly, it is to be noted that representations are generated of environments that contain triggered devices. Most often, as a triggered device moves around an environment, the corresponding representation also changes (reflecting the changed locations of the triggered device).

Secondly, consider the exemplary case of a user (carrying a triggered device) in a retail environment wishing to know what his spouse prefers in said retail environment. That is, we wish to show, within the representation of said user, the items that his spouse prefers at a given location, assuming that his spouse, carrying a triggered device, had previously visited the retail store and her mediated representations were stored in the system. Moreover, the user is authenticated to use his spouse's representations. As said user moves around the store, his representation changes at various locations showing what his spouse preferred at the corresponding locations.

A final example is provided when two users, e.g., a couple, are walking around in an environment and we wish to create a single representation that depicts the preferences of both, i.e., items that are predicted to be preferentially "liked" by both.

The above examples show a need to embed objects in representations and, furthermore, the embedded objects may need spatial and temporal synchronization. Whereas the notion of temporal synchronization is well known, e.g., temporal synchronizing of audio and video streams, adding spatial synchronization to temporal synchronization is novel.

It is known how to temporally synchronize two multimedia sub-objects by defining time stamps in both sub-objects derived from a single clock. But this technique does not work when, additionally, spatial synchronization is needed.

We propose a solution to this problem by defining the system clock (that is distinct from the IC) to generate signals of the form [x,y,t] where "x" and "y" refer to the spatial coordinates of the triggered device and "t" is the system time for that environment. All three parameters may be obtained from the BDs in the environment. The three forms of synchronization can now be achieved by synchronizing [x1,y1,t1] and [x2,y2,t2] as follows.

[x1,y1]=[x2,y2]=>spatial synchronization
[t1]=[t2]=>temporal synchronization
[x1,y1,t1]=[x2,y2,t2]=>spatial and temporal synchronization.

OTHER EMBODIMENTS

So far we have considered mainly one kind of environment in which the goal has been to discover items that a user is likely to like, e.g., the search problem. We now consider a second kind of environment, namely, one that additionally contains devices that can provide services to users. For example, an environment may contain an Internet Connected thermostat, or Music Rendering Device, etc. Our goal in such environments is to create representations that allow the user to discover and control said devices in the environment. As an illustrative example consider the environment depicted in FIG. 3 that shows ICD 500 providing, say, music service in a physical environment.

Figure 15:
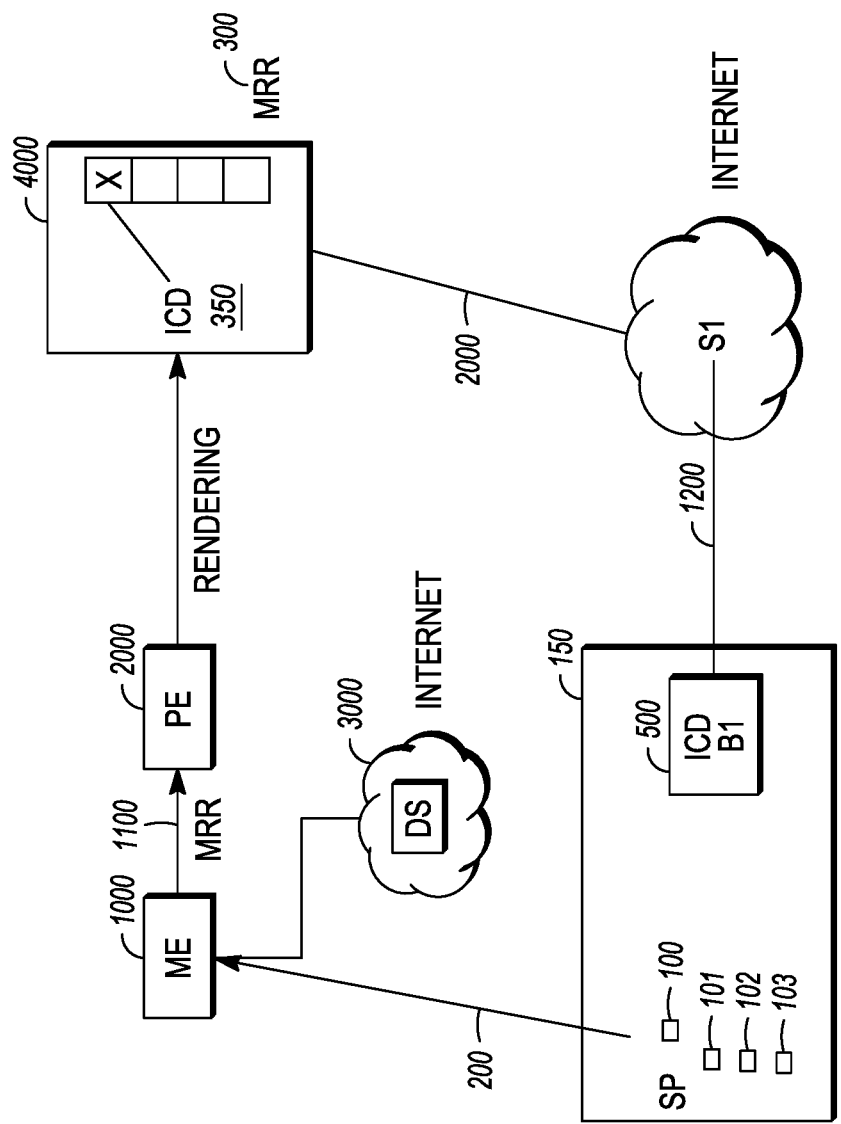
FIG. 15 shows discovery and control of services in an environment.

FIG. 15 shows environment 150 containing ICD 500, and user 100 carrying smartphone SP103 (triggered device), smart watch 102 and smart glasses 101. A representation 300 is being rendered on one of the user's physical devices, e.g., smart glass. The ICD 500 renders a music service in environment 150 through Internet service provider S1. The user's smartphone and BD B1 in ICD interact as described above to create a triggered device, resulting in ME 1000 being notified of the presence of the ICD 500. The ME 1000 recognizes that the BD is "special" and sends an inquiry to the Internet Directory Service (DS) 3000 asking for capabilities of said ICD. Conventional techniques are known which show how capabilities are discovered and ascertained in online networks. DS 3000 provides an API specification to ME that includes the provided API in the representation that it generates. The ME generates the representation 1100 and includes the API in said rendering 300.

Next, we decide to include the discovered ICD in the rendered representation 300. In this example, for illustrative purposes, the discovered ICD is shown as a part of a list of all discovered devices in environment 150. The user of the representation, using the commands provided for the physical device upon which the representation 300 is being rendered (e.g., smart glasses), selects the ICD from the device and commands it to play music. The rendering application program accepts the command and, using the API provided as a part of the representation 300, issues said command to the Internet service provider S1 using the Internet connection 2000. Service provider S1, using the interface and connection 1200, instructs ICD 500 to play music.

It is envisaged by the present invention that ME 1000 knows the credentials of the user for various service providers, i.e., the user has communicated his credentials to ME. The ME 1000 includes user credentials in the representations that it generates so that when rendering a representation, we may include the user's credentials. Thus, in the illustrative example above, the rendering application may utilize the user credentials when instructing the service provider S1 to play music for the user. This allows S1 to personalize its service to the preferences of the user. In those cases that the user does not have an account with S1, the service provider may ignore the user credentials.

Mixed Representations

The term mixed representation refers to either of two types of representations.

A representation that uses components from two or more representations and combines them into a single representation.

A representation that includes within it a representation of the triggered devices(s).

Mixed Representation (Type 1)

As an illustrative example of a Type I Mixed Representation consider a user John in a retail establishment that has deployed BDs. As described above the user's smartphone, acting as a triggered device, causes a mediated representation of the retail environment to be generated in which the immediate surroundings of the user, i.e., the retail items, ICDs, etc., are captured. Assume the system has access to a "stored representation" of John's spouse Mary, i.e., Mary had visited the same retail establishment sometime in the past and the representations generated by the system during her visit have been recorded and saved. It is now possible to mix components from Mary's stored representations into John's representations to create a single "mixed" representation that may be rendered, say, on John's smart glasses. Thus, for example, when John reaches a certain physical location in the retail establishment that had also been visited by Mary, the rendering on John's smart glasses may contain a list of items that Mary had liked at that location. Thus, John gets to know what his spouse liked at that particular spot. As John moves around the retail establishment to other locations his spouse's likes as shown in the representation that is being rendered for John are updated based on John's locations being spatially synchronized with his spouse's stored representations. As has been described above, the system of the present invention generates representations that may require use of user credentials. Such credentials may be used as authority mechanisms to allow access to stored representations.

The present invention does not limit the notion of mixing a user's representations with that of a spouse (or friend), but more generally is applicable to any party other than the user himself. By way of example, consider the retail establishment in the above example identifying and delineating certain aspects of its physical locations referred to as "Ad Spots". As the User John reaches one of the locations referred to as an Ad Spot, the system solicits and receives, from a service provider, content that is mixed into John's representation. For example, the content may show what the service provider, say J. C. Penny, recommends in terms of retail items at that Ad Spot. It should be noted that the recommendations/contents are synchronized with the physical movements of the user (user's location) and related to the retail items in the surrounding (immediate) context of said user. Thus, the solicitation from the system must contain a description or reference of the retail items at the indicated Ad Spot. Alternatively, the retail items at various Ad Spots could be pre-published to potential service providers.

In particular, as discussed above, the solicitation request may contain the user's credentials, causing the service provider to provide personalized service to the user's preferences, e.g., Spotify may recommend music based on what it has learnt about the user's music tastes. As stated above, the present invention envisages that several service providers will maintain a user's preferences on a variety of items and issues.

In cases where the user's credentials are not known, or the user is not known to the retail establishment, i.e., an anonymous user, or simply by choice of retail establishment, the system may integrate a non-personalized component provided by an advertiser into a user's representation(s). These components may be thought of as akin to traditional advertisements but differ in that their rendition in the user's representation are temporally and spatially coordinated with the movements of the user in a given environment.

Figure 16:
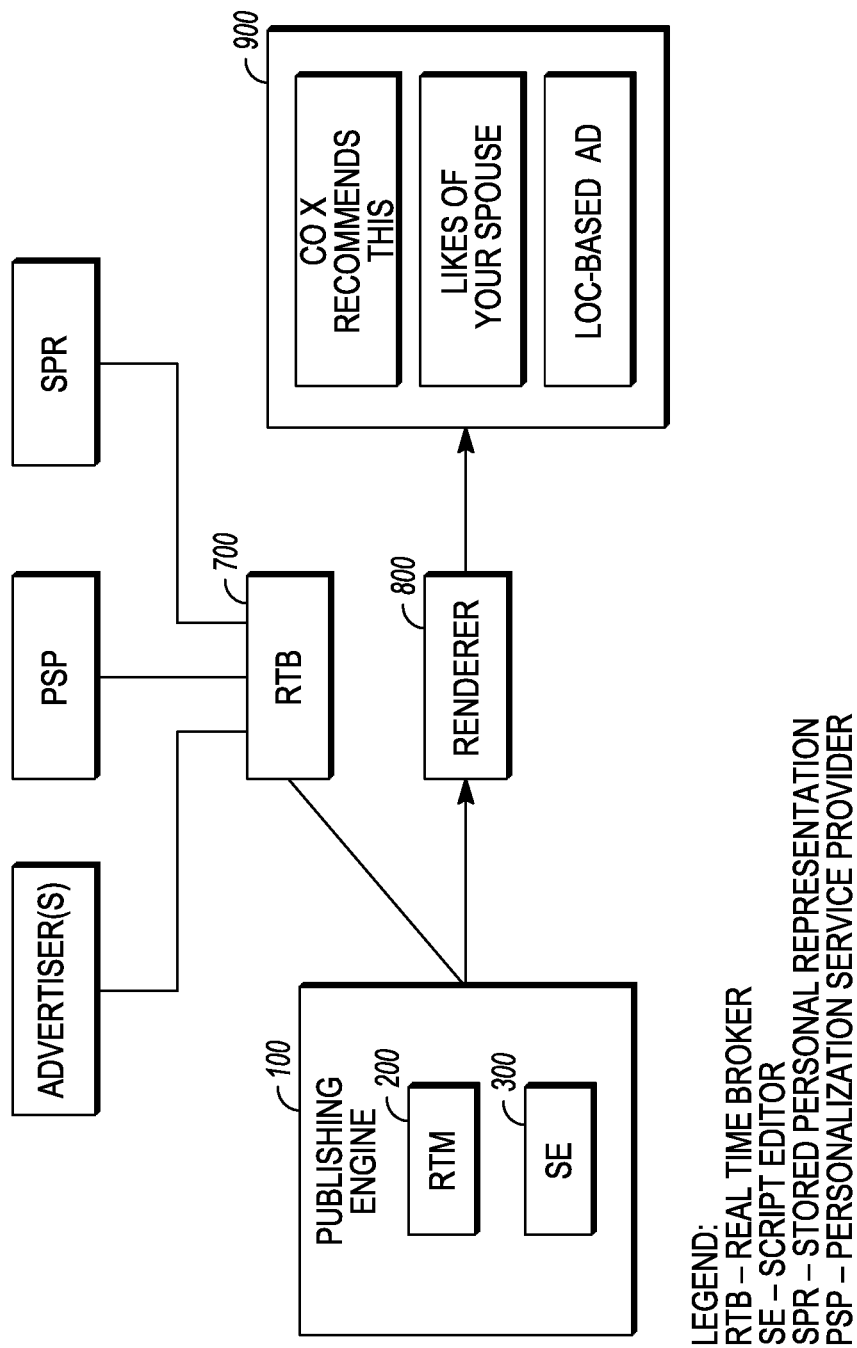
FIG. 16 shows the architecture of creating mixed representations.

FIG. 16 provides details on creating Type 1 mixed representations. The system, as described above, contains the Publishing Engine (PE) 100 containing Real Time Mixer (RTM) 200 and Script Engine (SE) 300. PE is further connected to a Real Time Broker (RTB) 700 that arbitrates requests between the Publishing Engine and a plurality of Service Providers referred to variously as Advertisers 600, Personalized Service Providers (PSP) 500, and Stored Personal Representation (SPR) providers 400.

The Publishing Engine, as described above uses Layout Manager and Typography Manager modules to construct representations. In particular, the Layout Manager uses the inferred user intent to select a background layout for the rendering of the representation. For example, it may choose a "shopping" specific layout or a "navigation" specific layout, etc., for different inferred user intents. Additionally, it uses SE 300 to store specifications of components that are to be used and the delineated Ad Spots. The Ad Spot locations may be specified by human curation interfaces or determined automatically by using spatial-temporal timestamps between two or more representations as discussed earlier.

The Publishing Engine produces one or more representations continuously at a periodic pre-determined and configurable rate and provides them to TPP that render them on various physical devices. FIG. 16 shows an example representation 900 that contains, in addition to possible other components, components "Spouse Likes" 2000, "Spotify Recommends" 1000, and "Advertisement" 3000.

The present invention envisages the construction of a new kind of advertising network based on mixed representations containing recommendations of friends, personalized service providers and location-based advertisers and advertisements. It is to be noted that unlike traditional advertising networks, e.g., internet advertising or location-based advertising networks, the present invention makes possible an advertising network in which the advertisements, recommendations and advice are spatially-temporally synchronized with the movements of users in environments, said synchronizations made possible by the triggered devices within said environments.

Figure 17:
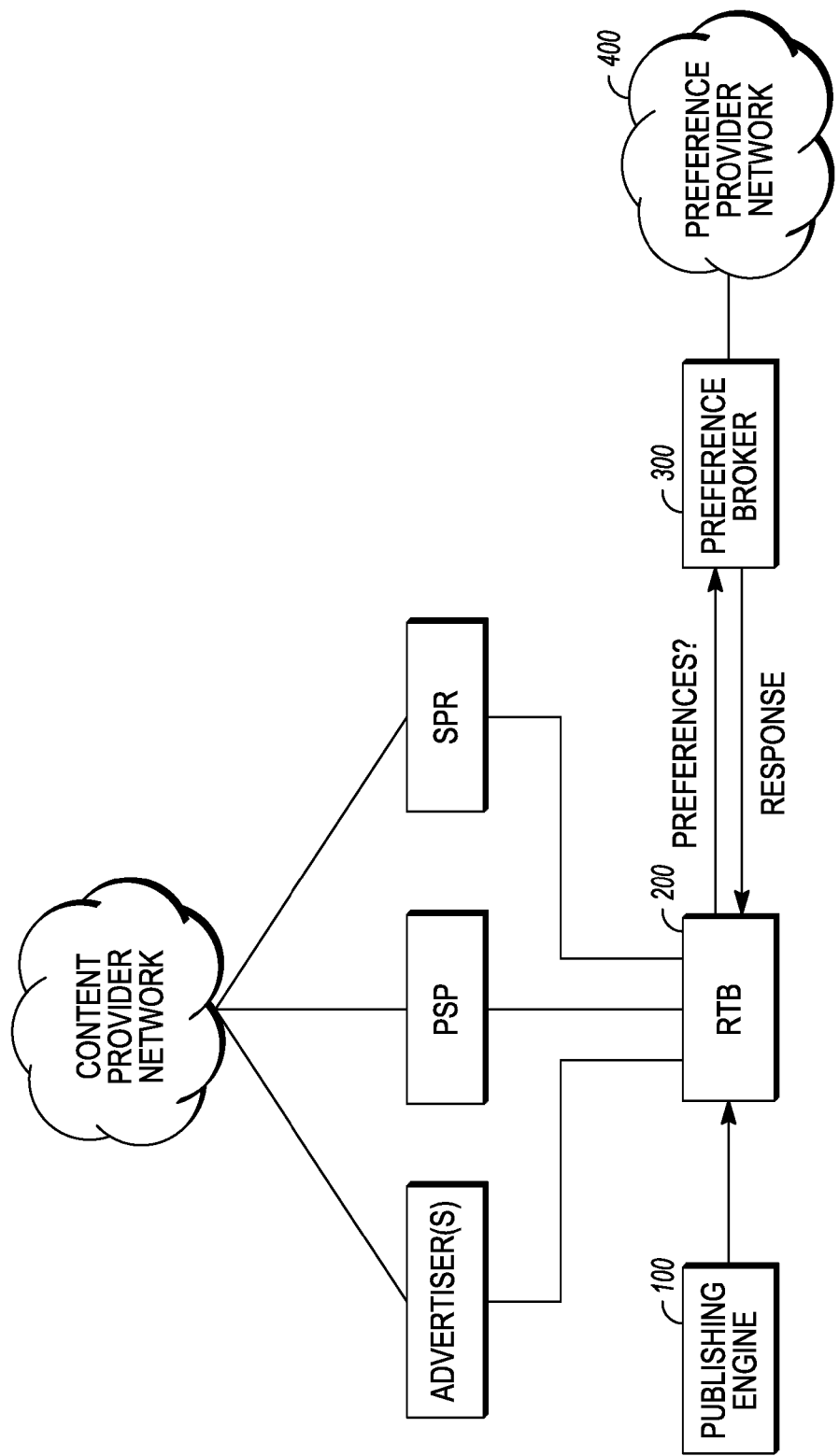
FIG. 17 shows the architecture for dis-aggregating user preferences and content.

Another differentiating aspect of the advertising network engendered by the present invention is shown in FIG. 17. As is known several service providers currently provide personalized services by having learnt and stored user preferences. Examples of such providers are Spotify and Pandora who have learnt user's musical preferences, Netflix that has learnt user's movie preferences, etc. The present invention makes it possible to envisage a disruption by dis-aggregating the contents and the user preferences within a single service provider.

In FIG. 17 the Publishing Engine 100 solicits a component or service from the RTB 200 in order to create a mixed representation (as described above). The solicitation contains user credentials that are used by the RTB to request a Preference Broker 300 for said user's preferences. The Preference Broker 300 has access to a preference provider network 400 that supplies the requested preferences in a pre-determined format, e.g., JSON (Java Script Object Notation). The RTB then proceeds to solicit content objects from the content provider network 500.

Thus, a content provider based on the user preferences supplied via the RTB may personalize its content objects. The system may then create mixed representations in which various components may be assembled and arranged together, said components being personalized by user preferences provided by the preference provider network (via the preference broker) and the content objects being provided by the content provider network.

Mixed Representation (Type 2)

Before describing mixed representations of Type 2, it is instructive to summarize elements of the various embodiments described earlier. In particular, we have described embodiments in which a triggered device causes representations to be generated using the preferences of a particular user (Preferred Embodiment, First Exemplary Embodiment, etc.). We have also described how a triggered device may cause representations to be generated that are preferentially biased to a plurality of users (Fifth Exemplary Embodiment Scenario 2, etc.) But in all these descriptions, the triggered device itself was not an object contained in a representation and controllable via that representation. Representations that contain the triggered device and its control API (or in which the control API for the triggered device may be obtained from an external/internal resource) are called Type 2 Mixed Representations.

As an example, consider a robot with an embedded triggered device (or acting as a triggered device) in a physical environment (such as a factory floor).

In Type 2 Mixed Representation the triggered device causes representations to be generated as described above with the additional constraint that said representation contains the triggered device as an object, along with its control API. Thus, users viewing said representations may discover the triggered device and, using the control API of the triggered device, issue commands to the triggered device (as described in Second Exemplary Embodiment and elsewhere above). As a consequence of said commands, the functioning of the triggered device/robot may be altered. For example, the triggered device/robot may be asked to change its route, or look for a certain item in the environment.

More particularly, a user's preferences may be input to the robot/triggered device, thus making the robot's actions preferentially biased to the preferences of a user. As discussed above, user preferences may be input through a human-curation interface or retrieved from the storage of the ML Complex (saved history of past users). Thus, when facing multiple options the robot's choice may be biased to the preferences of a certain user (or a plurality of users if the robot's OS supports multiple virtual instances). Thus, autonomously acting robots and computer programs when required to make a choice from multiple options can be made to make choices that reflect the preferences of certain users. For example, a chess-playing program may be made to play like Bobby Fisher (having learnt chess moves that Bobby Fisher made from a chess games database).

Consider a robot with an embedded triggered device in an environment causing a succession of representations to be generated. The availability of such representations to humans is subject to latency, processing and transmission delays. In such cases having a robot making autonomous choices is of tremendous value. Even more valuable would be the capability to alter the robots decision-making when it is deployed in far off locations, i.e., human observers learn from the representations and change the decision-making of the robot. Thus, human observers learn and then transfer their new learning to the robot by the mechanisms described herein.

Privacy and Anonymity

The description of the present invention so far has relied on an "all or nothing" policy of user privacy. If the user's smartphone device does not subscribe to the service, i.e., it is not responsive to BDs in the manner described above, the system of the present invention remains uninfluenced by said user's data and movements. It should also be noted that inferences made on behalf of users are based on anonymous data, i.e., the inference techniques are based on aggregates of data rather than individually identified data feeds.

Additionally, the present invention uses a group of attributes that together comprise a personal user profile. Each user is allowed to declare which attributes of his personal profile are to be considered "private" or "public". Only the public data attributes in the user's personal profile are used in calculations performed by the system.

Handling "Missing" or "Unknown" data and Accuracy of Predictions

Historically, ML technologies have considered the issues of "missing" or "unknown" data from the point of view of accuracy of predictions because a "sparse" data set leads to inaccurate predictions. The accuracy of the function being learned drops when the training data set is sparse. If the data set is "too sparse" the learning algorithm may fail to "converge" and thus no training is possible. Various techniques have been developed to handle such situations and the literature in this area is replete with such teachings.

The issue of user-friendliness of computer software system is intimately tied to this historical trend. In usability engineering it is often assumed that a fully automated system is more user friendly than one that is less automated. This is based on the perception that an automated system does not require user's to take actions or make decisions.

The present invention uses a novel approach to the issue of privacy, user-friendliness and accuracy of predictions by introducing a model of Participatory Machine Learning (PML). The central idea of PML is to involve the user in the training part of the ML process. This is accomplished by allowing the user to increase or decrease the sparseness of his input parameters and gauge the resulting predictions. By varying the sparseness of input data the user causes the predictions to be less or more accurate. More usefully, the predictions may be made more or less accurate with respect to particular situations, i.e., domains (as will be explained shortly). Thus, a user may get accurate travel or entertainment predictions but less accurate retail predictions by providing more personal data in the former cases and less in the latter. Such a prioritization of the accuracy of predictions is a novel concept in machine learning technology.

PML technology is based on the module discussed above that stores previously generated representations of users (indexed by time and location). A user is allowed to introspect on his stored representations by re-playing a particular representation. In essence this allows the user to virtually re-visit the original location, e.g., the retail store. As the journey is re-played the user is allowed to pause the representation at various junctures and examine the predictions made at that juncture. The user is then allowed to add, delete, or modify his personal data parameters, i.e., his personal user profile parameters as described above, and asks the system to generate a set of (hypothetical) predictions (in the sense that these predictions are based on the newly changed data set). The Training Data Set (described in FIG. 11 as module 3000) is then selectively modified by heuristic procedures in Input Formulator 1000 (FIG. 7) and the system goes through another round of training. The user is then presented with both sets of predictions, i.e., the predictions from the original (stored) visit and those from the new re-visit. Thus, the user becomes aware of the consequences of providing his personal data decisions with respect to that environment, i.e., retail, without impacting other environments. The user after such an introspection of an environment may then decide what data parameters to make public or private for future visits to said environment. It should be noted that re-playing a journey does not necessitate the user undertaking a physical journey to that location. The re-playing of the representation is with respect to the stored version of the previous representations.

The use of this technology is clear in privacy concerns. A user provides less data (in certain parameters) in those environments, e.g., retail, in which he is concerned with his privacy. A user provides more data in those environments in which he is less concerned. And he makes this choice by deliberating the consequences of the data he provides.

In one case the system is more automated, i.e., acts much more like a "black box", and its predictions are inscrutable. In the other case the system is more open and transparent, its predictions less reliable (even unavailable in some cases).

But this is exactly the sort of deliberative process that engages the user who is asked by the system to make his own privacy choices and consequently his predictions are modulated by his choices.

It is also clear that this approach is in contrast to fully automated systems wherein it is assumed that the latter are user-friendlier. In fully automated systems the goal of the designer of the system is often to maximize the gain, e.g., the income of a bank's automated loan approving system. In Participatory Machine Learning (PML) systems the goal is to make the user more aware of the consequences of his decisions to provide or withhold data. The social commentator Evgeny Morozov has termed this distinction as increasing the deliberative efficiency of society as compared to the efficiency of the computer system.

Additional features are shown in the remaining figures as follows.

Figure 18:
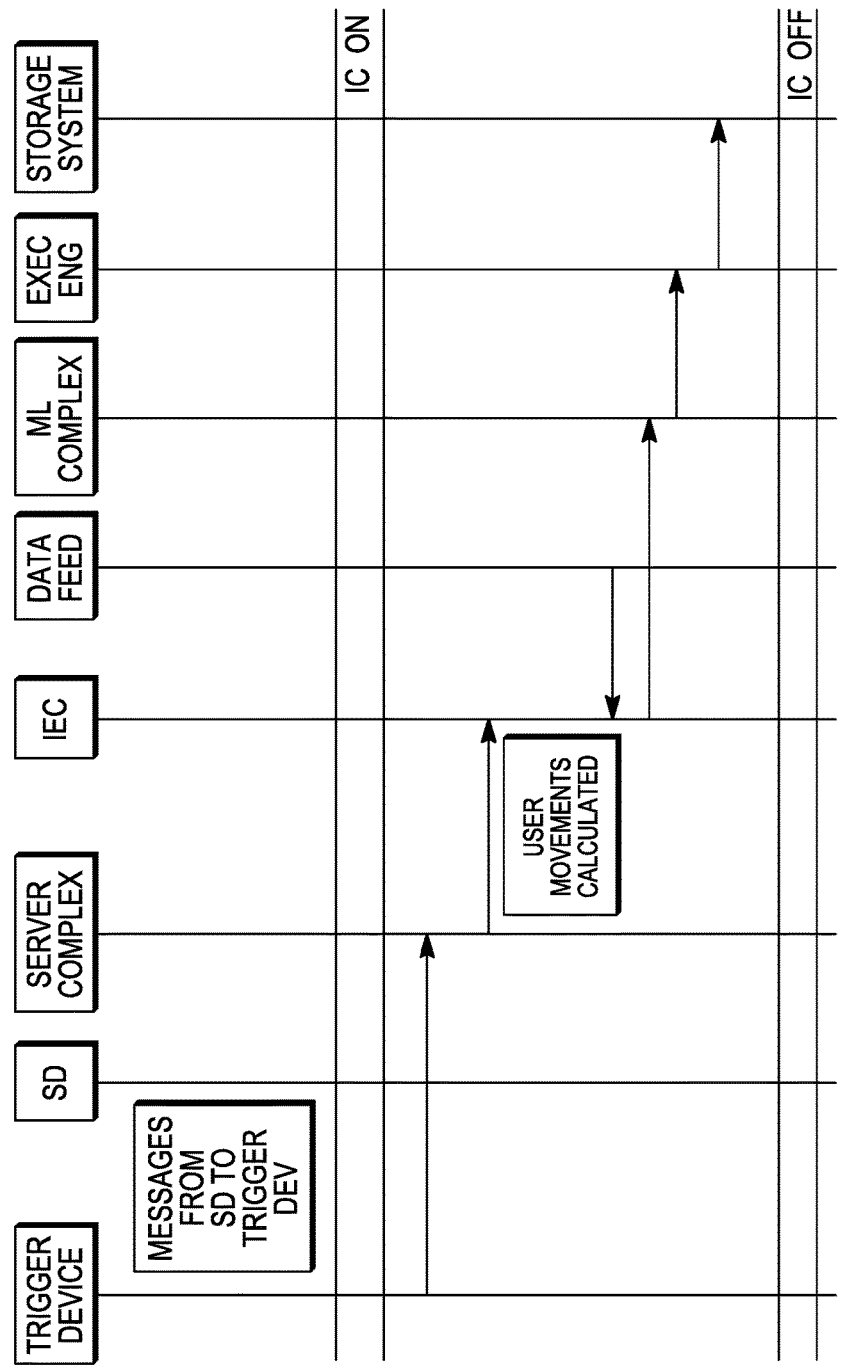
FIG. 18 shows a Control Sequence Diagram (CSD) for creating and storing a representation.

FIG. 18 shows a Control Sequence Diagram (CSD) for creating and storing a representation.

Figure 19:
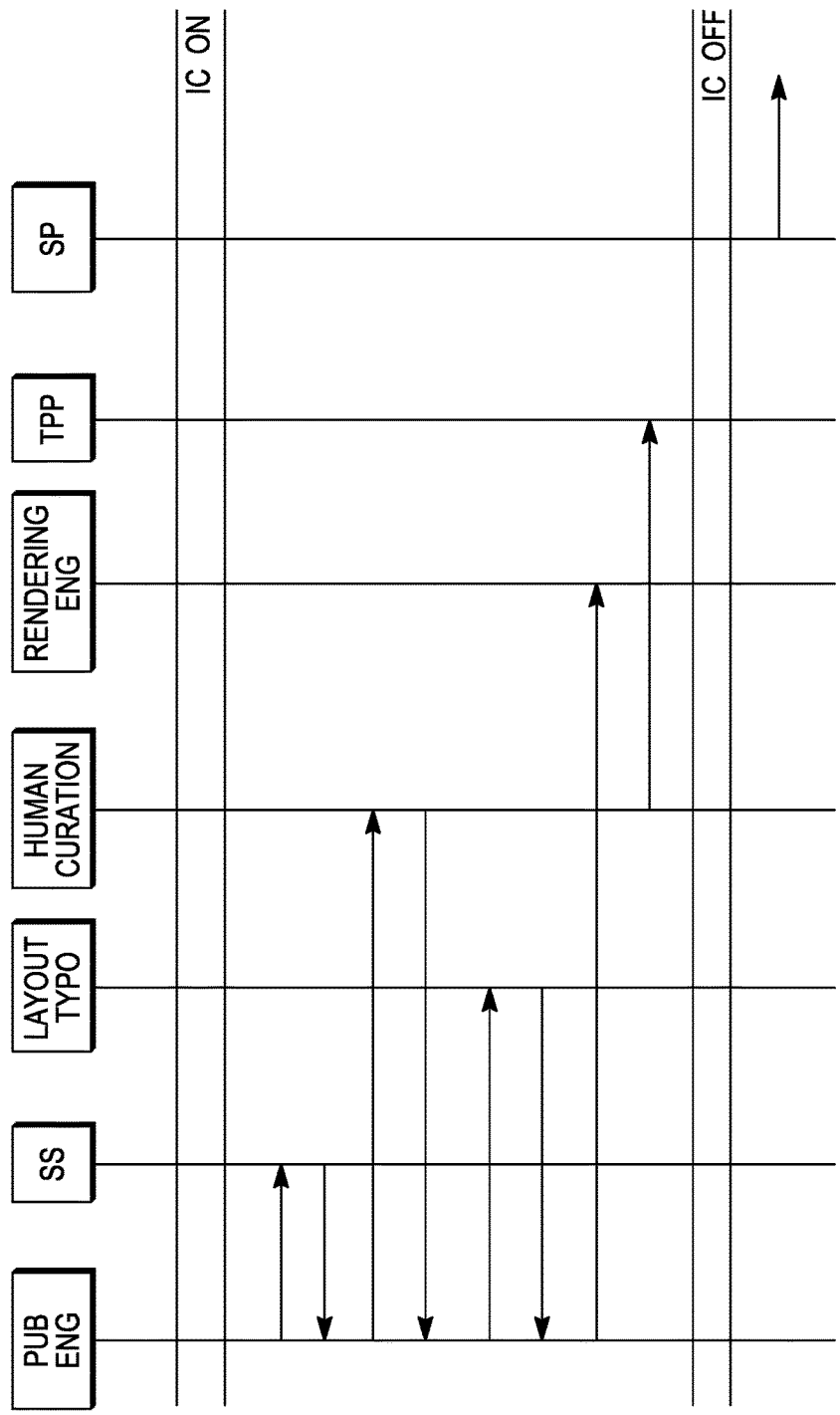
FIG. 19 shows a CSD for publishing a representation.

FIG. 19 shows a CSD for publishing a representation.

Figure 20:
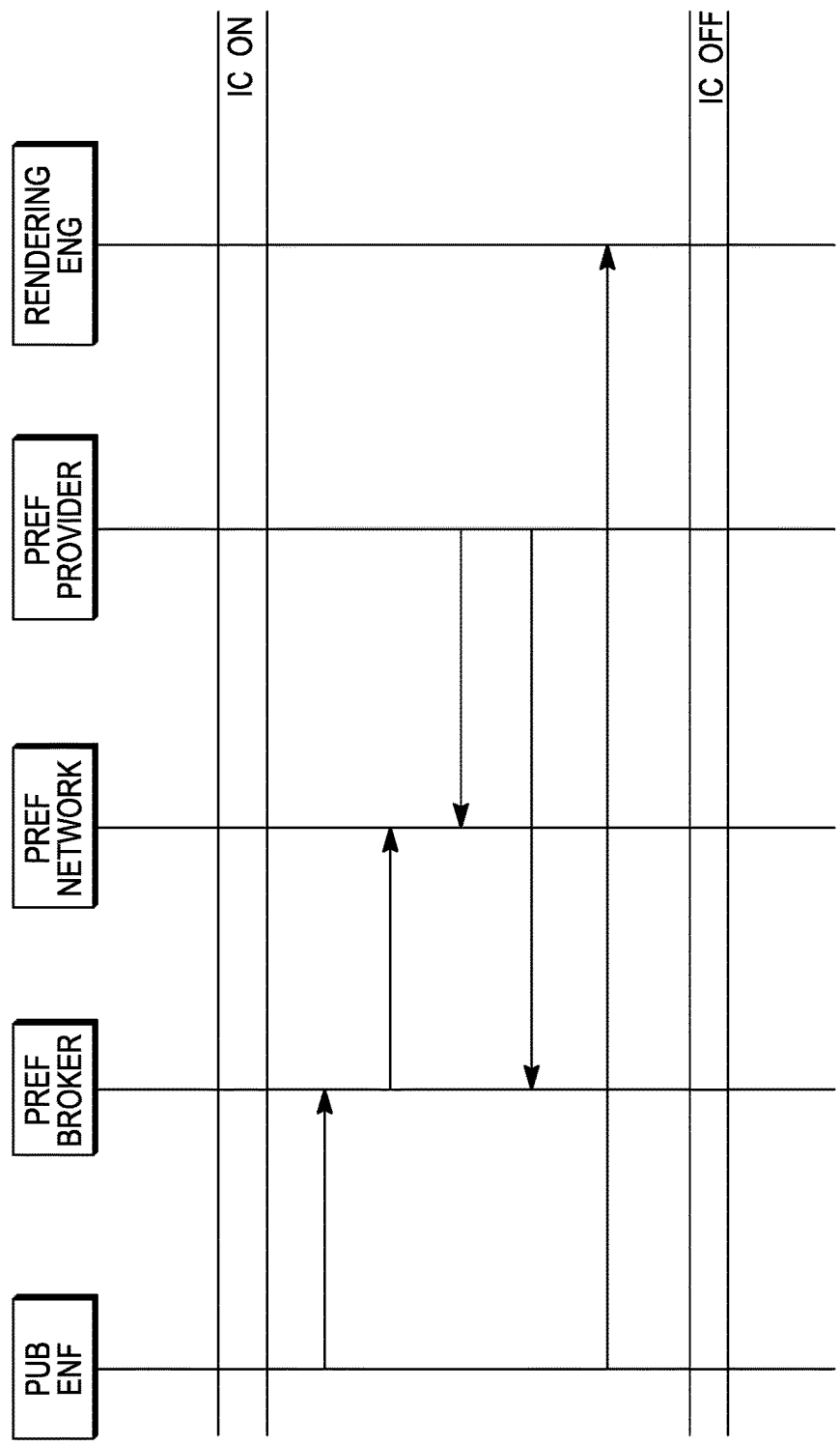
FIG. 20 shows a CSD for using a preference broker in a rendering of a representation.

FIG. 20 shows a CSD for using a preference broker in a rendering of a representation.

Figure 21:
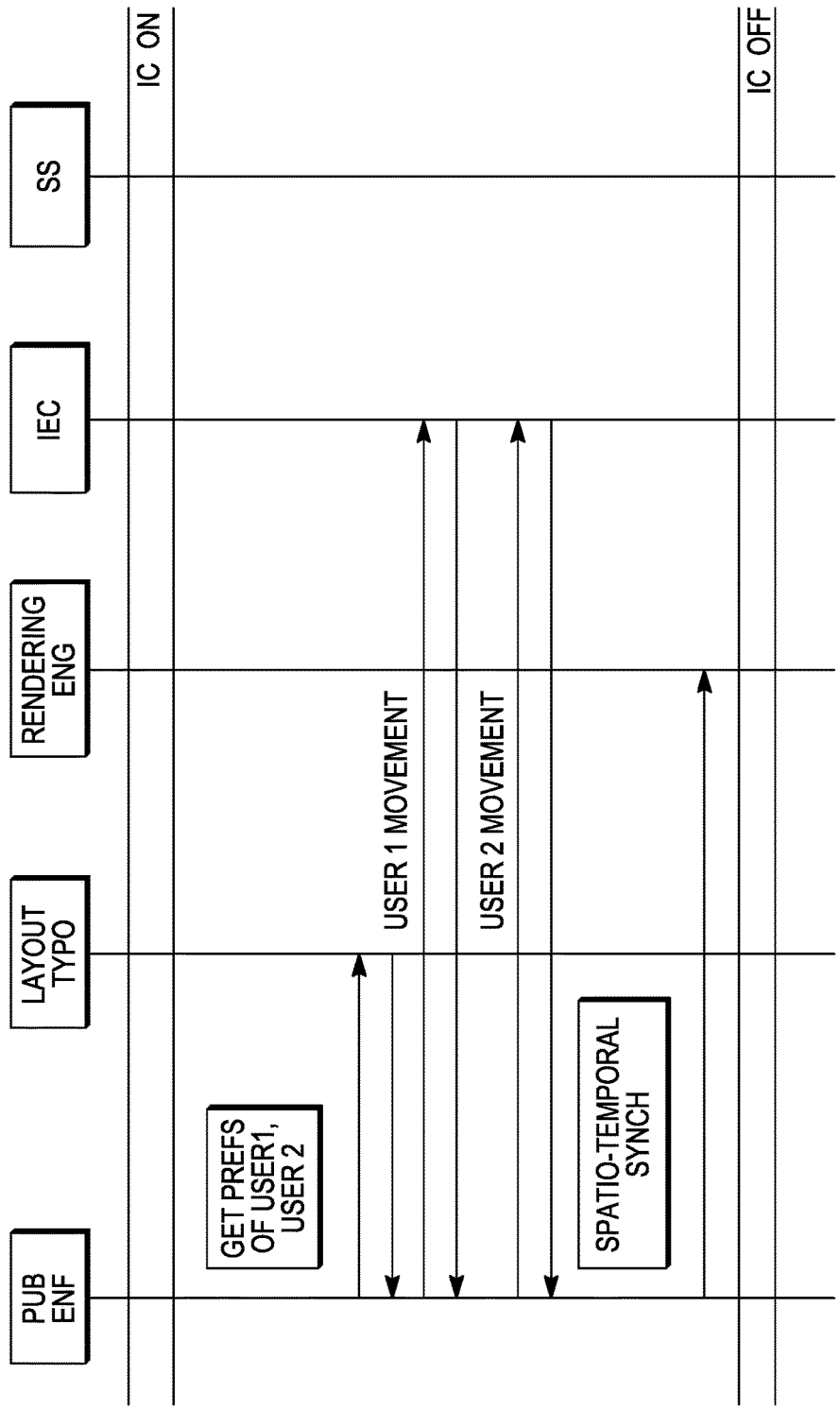
FIG. 21 shows a CSD for creating a mixed representation.

FIG. 21 shows a CSD for creating a mixed representation.

Figure 22:
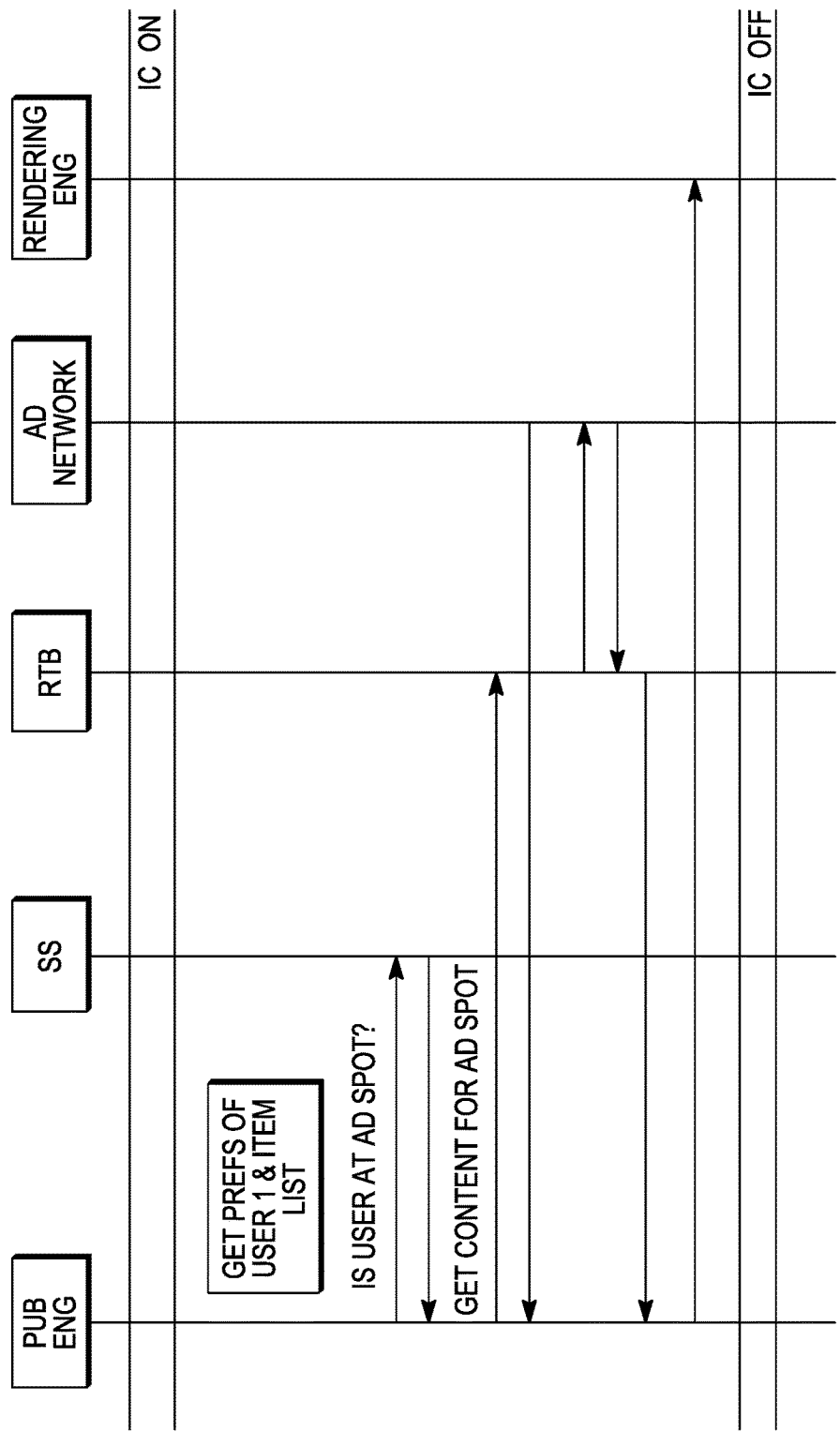
FIG. 22 shows a CSD for creating a mixed representation with content from an Ad Network.

FIG. 22 shows a CSD for creating a mixed representation with content from an Ad Network.

Figure 23:
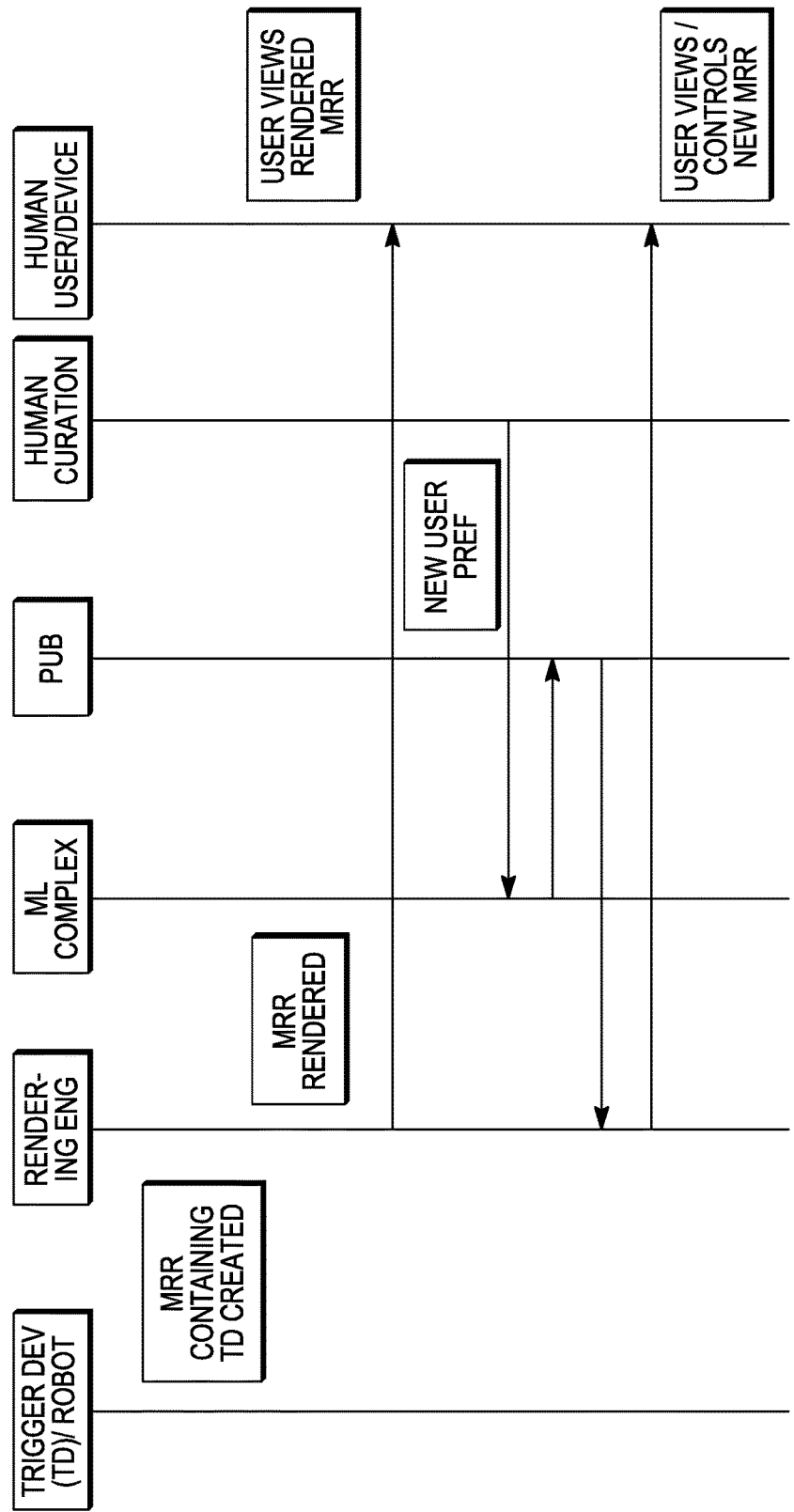
FIG. 23 shows a CSD containing the Triggered device (TD) and modification of the user preferences of the TD.

FIG. 23 shows a CSD containing the Triggered device (TD) and modification of the user preferences of the TD.

Figure 24:
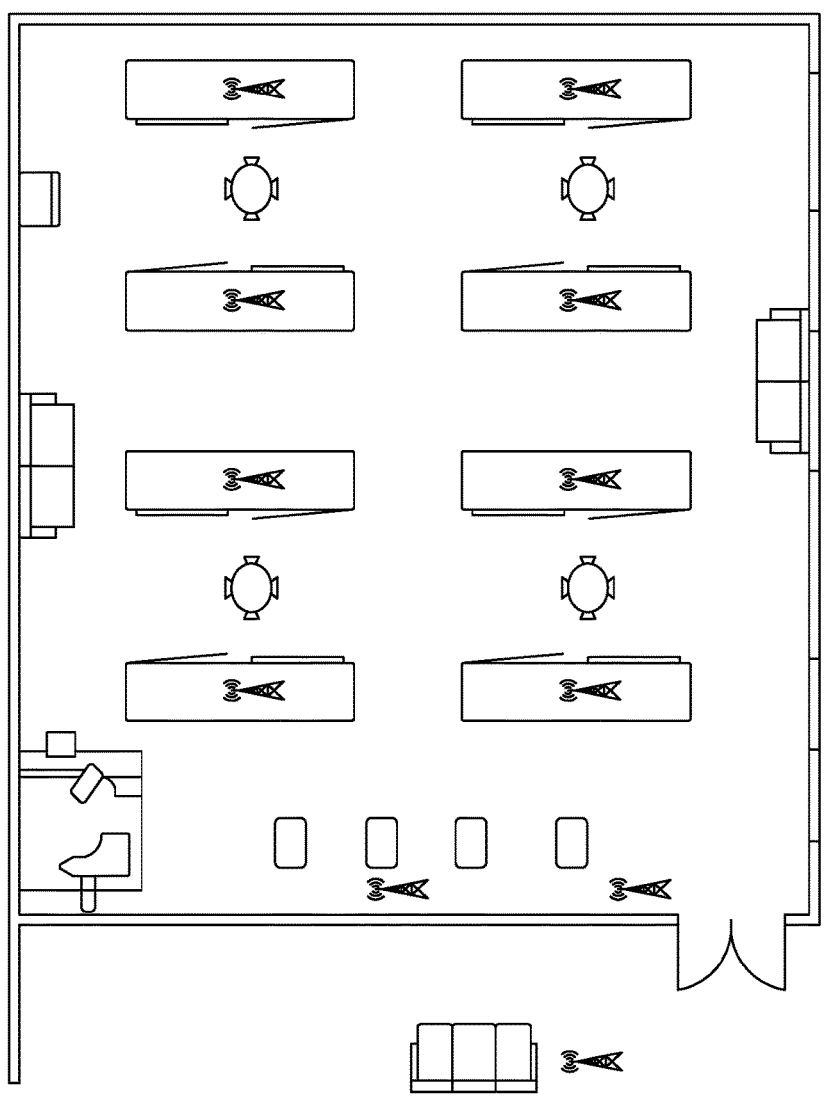
FIG. 24 shows an environment derived from a planogram of a retail establishment (a music store).

FIG. 24 shows an environment derived from a planogram of a retail establishment (a music store).

Figure 25:
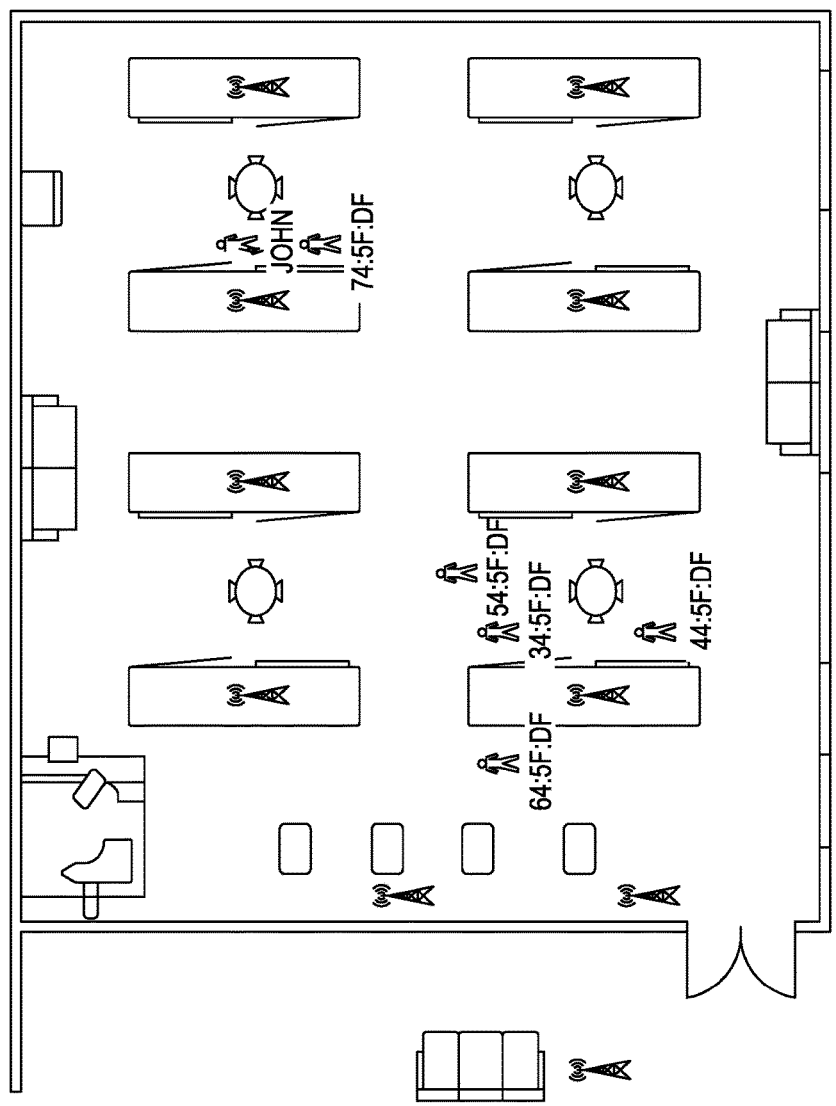
FIG. 25 shows several potential Triggered devices in the retail establishment's environment.

FIG. 25 shows several potential Triggered devices in the retail establishment's environment.

FIG. 26 shows a user identification (John) being associated with a Triggered device.

Figure 27:
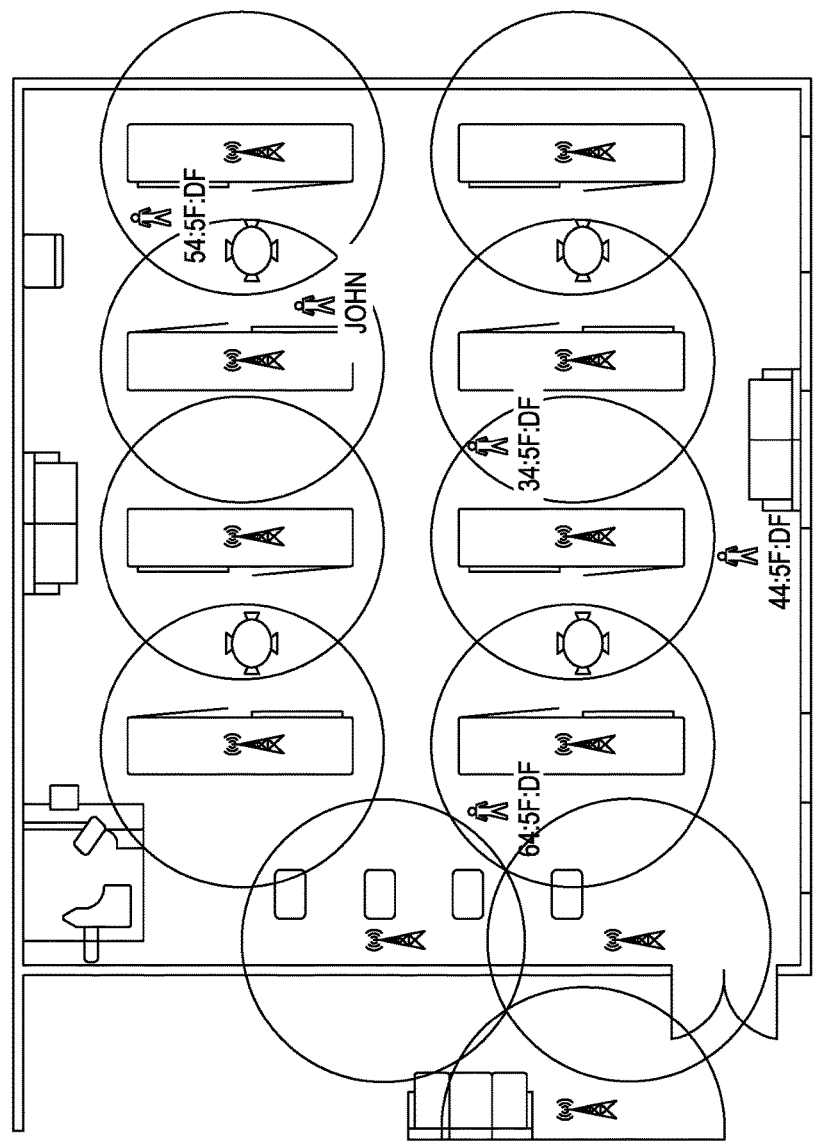
FIG. 27 shows a representation delineating the hot zones of the retail establishment by calculating user movements in the representation.

FIG. 27 shows a representation delineating the hot zones of the retail establishment by calculating user movements in the representation.

Figure 28:
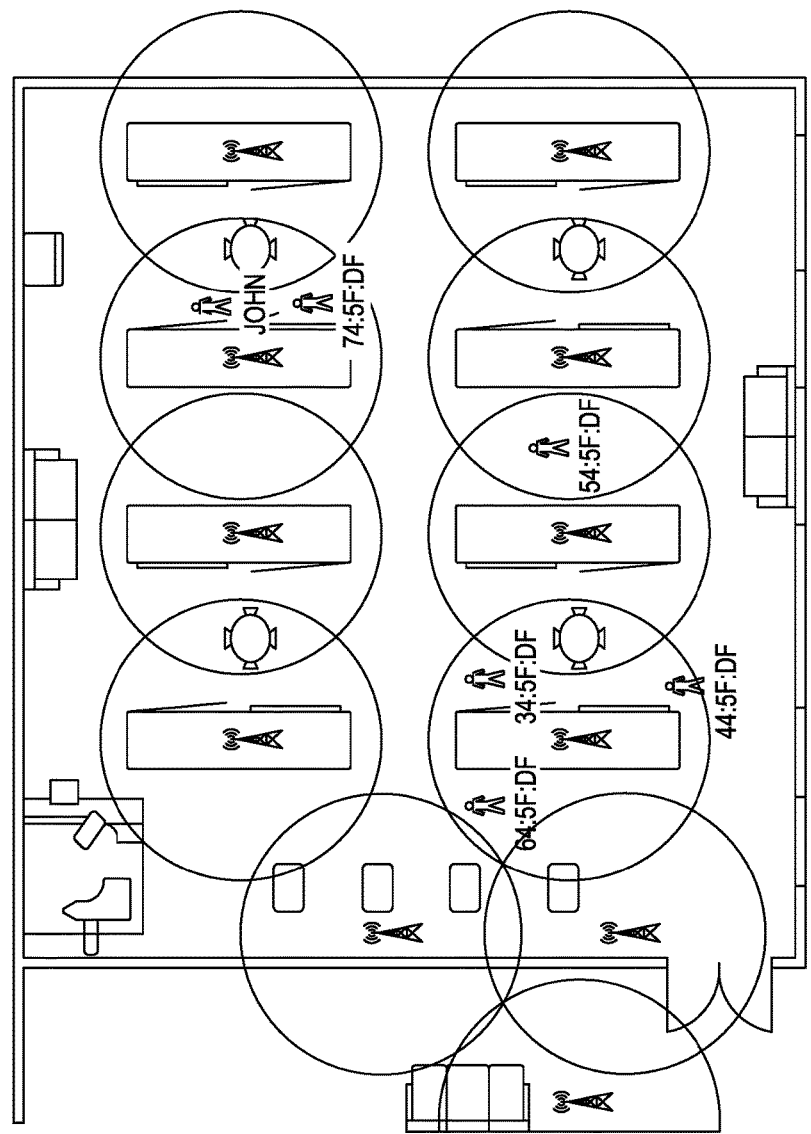
FIG. 28 shows zones of the retail store where John "lingered".

FIG. 28 shows zones of the retail store where John "lingered".

Figure 29:
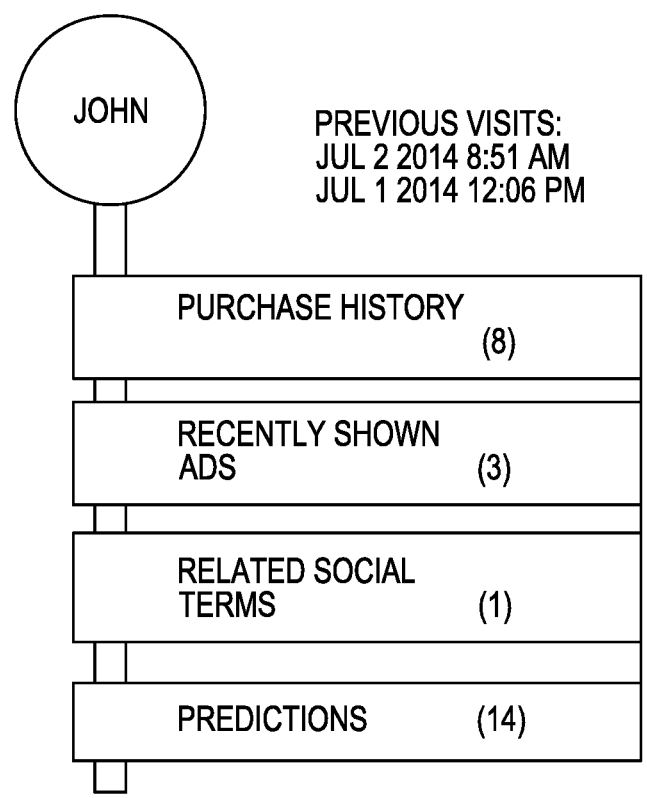
FIG. 29 shows CRM data being utilized for user John.

FIG. 29 shows CRM data being utilized for user John.

FIG. 30 shows system deriving historical music related purchase data for John.

Figures 31, 32, 33:
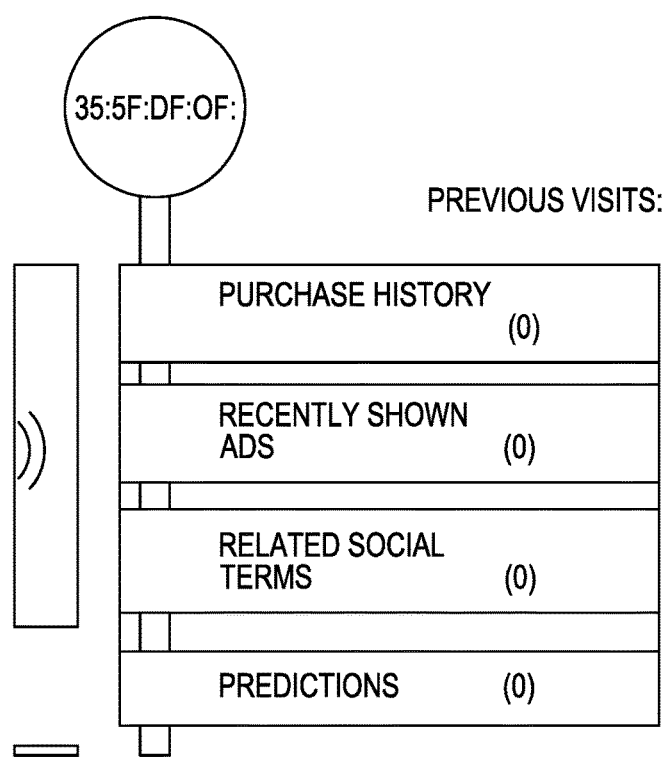
FIG. 31 shows system deriving music related social context for John.
FIG. 32 shows data related to John's (historical) web advertising context.
FIG. 33 shows a device that has not registered for service, it is unknown to the system.

FIG. 31 shows system deriving music related social context for John.

FIG. 32 shows data related to John's (historical) web advertising context.

FIG. 33 shows a device that has not registered for service, it is unknown to the system.

FIG. 34 shows the preferences derived by the system for user John.

Illustrative Computing Environment

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, programmable consumer electronics, network PCs, minicomputers, mainframe computers, personal digital assistants (PDAs), gaming devices, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 35:
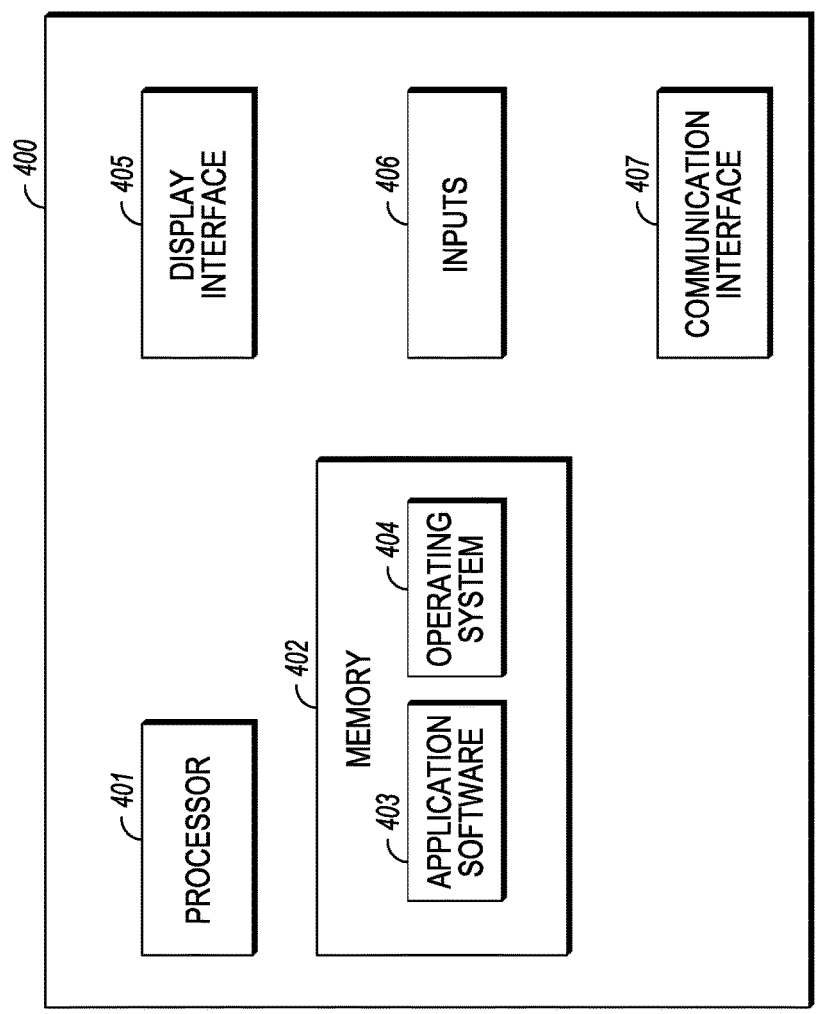
FIG. 35 illustrates various components of an illustrative computing-based device in which embodiments of various servers and/or clients as described herein may be implemented.

FIG. 35 illustrates various components of an illustrative computing-based device 400 which may be implemented as any form of a computing and/or electronic device, and in which embodiments of a server and/or a client as described above may be implemented.

The computing-based device 400 comprises one or more inputs 406 which are of any suitable type for receiving media content, Internet Protocol (IP) input, activity tags, activity state information, resources or other input. The device also comprises communication interface 407 to enable the device to communicate with one or more other entity using any suitable communications medium.

Computing-based device 400 also comprises one or more processors 401 that may be microprocessors, controllers or any other suitable type of processors for processing computing executable instructions to control the operation of the device in order to provide a search augmentation system. Platform software comprising an operating system 404 or any other suitable platform software may be provided at the computing-based device to enable application software 403 to be executed on the device.

The computer executable instructions may be provided using any computer-readable media, such as memory 402. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 405 is provided to control a display device to be used in conjunction with the computing device. The display system may provide a graphical user interface, or other user interface of any suitable type.

The invention claimed is:

1. A method of generating a representation of an environment in which a triggered device receives signals from a Broadcasting Device (BD), comprising:
receiving over one or more communication networks one or more environmental data sets (EDSs), at least one of the EDSs including information relating to the environment, at least one of the EDSs being obtained from a triggered device located in the environment and which receives signals from a BD associated with the environment, the triggered device including a mobile communication device associated with a first user;
determining at least one preference of a second user by accessing a previously stored representation that is generated during a prior visit by the second user to the environment;
organizing into a first representation of the environment at least some of the information included in the one or more EDSs in accordance with said at least one preference of the second user, wherein organizing into the first representation of the environment further includes organizing into the first representation additional information concerning the at least one preference of the second user, the additional information being obtained at least in part from the previously stored representation; and
causing the first representation to be rendered on at least one rendering device.

2. The method of claim 1 wherein the second user is a user who has visited the environment at a time prior to a current visit of the first user to the environment.

3. The method of claim 1 further comprising spatially synchronizing the first representation of the environment with the previously stored representation.

4. The method of claim 1 wherein the additional information is included in the first representation when the first user is proximate to a location in the environment that is spatially synchronized with a location in the previously stored representation at which the at least one preference of the second user is associated.

5. The method of claim 1 wherein the at least one rendering device is the mobile communication device associated with the first user.

* * * * *